(12) United States Patent
Tu et al.

(10) Patent No.: US 11,132,516 B2
(45) Date of Patent: Sep. 28, 2021

(54) SEQUENCE TRANSLATION PROBABILITY ADJUSTMENT

(71) Applicant: Huawei Technologies Co., Ltd., Shenzhen (CN)

(72) Inventors: Zhaopeng Tu, Shenzhen (CN); Lifeng Shang, Hong Kong (CN); Xiaohua Liu, Shenzhen (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 16/396,172

(22) Filed: Apr. 26, 2019

(65) Prior Publication Data

US 2019/0251178 A1   Aug. 15, 2019

Related U.S. Application Data

(63) Continuation of application No. PCT/CN2017/108950, filed on Nov. 1, 2017.

(30) Foreign Application Priority Data

Nov. 4, 2016   (CN) .......................... 201610982039.7

(51) Int. Cl.
*G06F 40/58* (2020.01)
*G06N 3/08* (2006.01)
(Continued)

(52) U.S. Cl.
CPC ............ *G06F 40/58* (2020.01); *G06F 16/345* (2019.01); *G06F 40/35* (2020.01); *G06F 40/44* (2020.01);
(Continued)

(58) Field of Classification Search
CPC .......... G06F 40/58; G06F 40/35; G06F 40/44; G06F 40/51; G06F 16/345; G06F 40/205; G06N 3/02; G06N 3/08; G10L 15/26
See application file for complete search history.

(56) References Cited

U.S. PATENT DOCUMENTS

| 8,597,589 | B2 | 12/2013 | Jansen et al. | |
|---|---|---|---|---|
| 2006/0155398 | A1* | 7/2006 | Hoffberg | G06K 9/00369 700/86 |

(Continued)

FOREIGN PATENT DOCUMENTS

| CN | 1841367 A | 10/2006 |
|---|---|---|
| CN | 103136195 A | 6/2013 |

(Continued)

OTHER PUBLICATIONS

Machine Translation and Abstract of Chinese Publication No. CN103207899, Jul. 17, 2013, 21 pages.

(Continued)

*Primary Examiner* — Michael N Opsasnick
(74) *Attorney, Agent, or Firm* — Conley Rose, P.C.

(57) ABSTRACT

A sequence conversion method includes receiving a source sequence, converting the source sequence into a source vector representation sequence, obtaining at least two candidate target sequences and a translation probability value of each of the at least two candidate target sequences according to the source vector representation sequence, adjusting the translation probability value of each candidate target sequence, selecting an output target sequence from the at least two candidate target sequences according to an adjusted translation probability value of each candidate target sequence, and outputting the output target sequence. Hence, loyalty of a target sequence to a source sequence can be improved during sequence conversion.

20 Claims, 6 Drawing Sheets

(51) Int. Cl.
    *G06N 3/02*     (2006.01)
    *G06F 16/34*     (2019.01)
    *G06F 40/35*     (2020.01)
    *G06F 40/44*     (2020.01)
    *G06F 40/51*     (2020.01)
    *G10L 15/26*     (2006.01)

(52) U.S. Cl.
CPC ............... *G06F 40/51* (2020.01); *G06N 3/02* (2013.01); *G06N 3/08* (2013.01); *G10L 15/26* (2013.01)

(56) References Cited

U.S. PATENT DOCUMENTS

| | | | |
|---|---|---|---|
| 2006/0224378 | A1 | 10/2006 | Chino et al. |
| 2011/0167110 | A1* | 7/2011 | Hoffberg ................ G05B 15/02 709/203 |
| 2013/0144598 | A1 | 6/2013 | Kutsumi |
| 2013/0262096 | A1* | 10/2013 | Wilhelms-Tricarico ..................... G10L 13/04 704/202 |
| 2014/0012564 | A1 | 1/2014 | Hwang et al. |
| 2014/0079297 | A1* | 3/2014 | Tadayon ............ G06K 9/00288 382/118 |
| 2014/0089241 | A1* | 3/2014 | Hoffberg ............ H04N 21/4131 706/14 |
| 2014/0201126 | A1* | 7/2014 | Zadeh .................... A61B 5/165 706/52 |
| 2017/0161635 | A1* | 6/2017 | Oono ..................... G06N 3/082 |
| 2018/0082172 | A1* | 3/2018 | Patel ..................... G06N 3/0472 |
| 2018/0247200 | A1* | 8/2018 | Rolfe .................... G06N 3/0445 |

FOREIGN PATENT DOCUMENTS

| | | |
|---|---|---|
| CN | 103207899 A | 7/2013 |
| CN | 104391842 A | 3/2015 |
| CN | 104965822 A | 10/2015 |
| CN | 105260361 A | 1/2016 |
| EP | 1679621 A1 | 7/2006 |
| JP | 2013117927 A | 6/2013 |

OTHER PUBLICATIONS

Machine Translation and Abstract of Chinese Publication No. CN104391842, Mar. 4, 2015, 21 pages.

Machine Translation and Abstract of Chinese Publication No. CN104965822, Oct. 7, 2015, 12 pages.

Machine Translation and Abstract of Chinese Publication No. CN105260361, Jan. 20, 2016, 15 pages.

Choi, H. et al, "Context-Dependent Word Representation for Neural Machine Translation," arXiv:1607.00578v1 [cs.CL], Jul. 3, 2016, 13 pages.

Tu, Z., et al. "Context Gates for Neural Machine Translation," Transactions of the Association for Computational Linguistics, vol. 5, 2017, pp. 87-99.

He, W., et al. "Improved Neural Machine Translation with SMT Features," Proceedings of the Thirtieth AAAI Conference on Artificial Intelligence (AAAI-16), 2016, pp. 151-157.

Tu, Z., et al. "Neural Machine Translation with Reconstruction," arXiv:1611.01874v2 [cs.CL], Nov. 21, 2016, 7 pages.

Cheng, Y., et al, "Semi-Supervised Learning for Neural Machine Translation," Proceedings of the 54th Annual Meeting of the Association for Computational Linguistics, Aug. 7-12, 2016, pp. 1965-1974.

Tu, Z., et al. "Modeling Coverage for Neural Machine Translation," arXiv:1601.04811v6 [cs.CL], Aug. 6, 2016, 11 pages.

Foreign Communication From a Counterpart Application, Chinese Application No. 201610982039.7, Chinese Office Action dated Mar. 28, 2019, 3 pages.

Foreign Communication From a Counterpart Application, Chinese Application No. 201610982039.7, Chinese Search Report dated Mar. 17, 2019, 2 pages.

Foreign Communication From a Counterpart Application, PCT Application No. PCT/CN2017/108950, English Translation of International Search Report dated Jan. 23, 2018, 2 pages.

Foreign Communication From a Counterpart Application, PCT Application No. PCT/CN2017/108950, English Translation of Written Opinion dated Jan. 23, 2018, 3 pages.

Wu, Y., et al., "Googles Neural Machine Translation System: Bridging the Gap between Human and Machine Translation," XP055435225, Oct. 8, 2016, 23 pages.

Xia, Y., et al., "Dual Learning for Machine Translation," XP080728584, Nov. 1, 2016, 9 pages.

Li, J., et al., "Mutual Information and Diverse Decoding Improve Neural Machine Translation," XP055453429, Mar. 22, 2016, 10 pages.

Foreign Communication From a Counterpart Application, European Application No. 17868103.7, Extended European Search Report dated Oct. 11, 2019, 8 pages.

\* cited by examiner

SEQUENCE TRANSLATION PROBABILITY ADJUSTMENT

CROSS-REFERENCE TO RELATED APPLICATIONS

This application is a continuation application of international patent application number PCT/CN2017/108950 filed on Nov. 1, 2017, which claims priority to Chinese patent application number 201610982039.7 filed on Nov. 4, 2016, which are hereby by reference.

TECHNICAL FIELD

The present disclosure relates to computer technologies, and specifically, to a sequence conversion method and apparatus.

BACKGROUND

With rapid development of computer technologies, a great progress has been made in deep learning research, and a breakthrough progress has also been made in sequence-to-sequence learning related to natural language processing. The sequence-to-sequence learning is a learning process of mapping a source sequence to a target sequence. An achievement of the sequence-to-sequence learning is mainly used for sequence conversion. Typical application scenarios of sequence conversion include machine translation, speech recognition, a dialog system (dialog system or conversational agent), automatic summarization, automatic question answering, image caption generation, and the like.

A typical sequence conversion method includes two stages an encoding stage and a decoding stage. At the encoding stage, a source sequence is usually converted into a source vector representation sequence using a recurrent neural network (RNN), and then the source vector representation sequence is converted into a source context vector using an attention mechanism. A part of a source sequence is selected and converted into a source context vector each time, and therefore, the source sequence can be converted into a plurality of source context vectors (so that a corresponding source context vector is generated for each target word at the decoding stage). At the decoding stage, a target sequence is generated by generating one target word each time. In each step, a decoder computes a current decoder intermediate state according to a current source context vector obtained at the encoding stage, a decoder intermediate state in a previous step, and a target word generated in the previous step, and predicts a target word in the current step according to the current intermediate state and source context vector.

When the sequence conversion method is applied to natural language processing, because a length of a source sequence and a length of a target sequence are both unfixed, the RNN may also be used for processing at the decoding stage.

In the RNN, a previously predicted target context vector is used as a main reference in a prediction process, and a source context vector is merely used as an extra input. Consequently, information corresponding to a current source context vector may not be correctly transferred to a corresponding target context vector, and excessive under-translation and over-translation occur. As a result, a predicted target sequence cannot loyally reflect information in a source sequence.

SUMMARY

Embodiments of the present disclosure provide a sequence conversion method and apparatus, so as to improve accuracy of a target sequence relative to a source sequence during sequence conversion.

A first aspect of the present disclosure provides a sequence conversion method, including receiving a source sequence, converting the source sequence into a source vector representation sequence, obtaining at least two candidate target sequences and a translation probability value of each of the at least two candidate target sequences according to the source vector representation sequence, adjusting the translation probability value of each candidate target sequence, and selecting an output target sequence from the at least two candidate target sequences according to an adjusted translation probability value of each candidate target sequence, and outputting the output target sequence.

The translation probability value of the candidate target sequence may be adjusted using a preset adjustment factor directly or using a preset adjustment algorithm. Adjusting the translation probability value using the adjustment factor can improve system processing efficiency, and adjusting the translation probability value using the adjustment algorithm can improve accuracy of the adjusted translation probability value.

The source sequence may be converted into the source vector representation sequence using a word vectorization technology.

With reference to the first aspect, in a possible implementation, obtaining at least two candidate target sequences according to the source vector representation sequence includes obtaining at least two source context vectors according to the source vector representation sequence based on an attention mechanism, obtaining respective decoding intermediate state sequences of the at least two source context vectors, and obtaining respective candidate target sequences of the at least two decoding intermediate state sequences, and adjusting the translation probability value of each candidate target sequence includes adjusting the translation probability value based on a decoding intermediate state sequence of each candidate target sequence.

Because a decoding intermediate state sequence can represent translation accuracy of a corresponding candidate target sequence to some extent, adjusting a translation probability value according to the decoding intermediate state sequence can improve accuracy of an adjusted translation probability value, thereby improving accuracy of a final target sequence.

With reference to either of the first aspect or the foregoing possible implementation of the first aspect, in a possible implementation, the at least two candidate target sequences include a first candidate target sequence, and the first candidate target sequence is any one of the at least two candidate target sequences, and adjusting the translation probability value based on a decoding intermediate state sequence of each candidate target sequence includes obtaining a reconstruction probability value of the first candidate target sequence based on a decoding intermediate state sequence of the first candidate target sequence, and adjusting a translation probability value of the first candidate target sequence based on the reconstruction probability value of the first candidate target sequence.

Because a decoding intermediate state sequence can represent translation accuracy of a corresponding candidate target sequence to some extent, adjusting a translation probability value according to the decoding intermediate state sequence can improve accuracy of an adjusted translation probability value, thereby improving accuracy of a final target sequence.

With reference to any one of the first aspect or the foregoing possible implementations of the first aspect, in a possible implementation, obtaining a reconstruction probability value of the first candidate target sequence based on a decoding intermediate state of the first candidate target sequence includes obtaining the reconstruction probability value of the first candidate target sequence based on an inverse attention mechanism, where an input of the inverse attention mechanism is the decoding intermediate state sequence of the first candidate target sequence, and an output of the inverse attention mechanism is the reconstruction probability value of the first candidate target sequence.

With reference to any one of the first aspect or the foregoing possible implementations of the first aspect, in a possible implementation, obtaining the reconstruction probability value of the first candidate target sequence based on an inverse attention mechanism includes obtaining the reconstruction probability value of the first candidate target sequence according to the following function:

$$R(x \mid s; \gamma_1) = \prod_{j=1}^{J} g_R(x_{j-1}, \hat{h}_j, \hat{c}_j; \gamma_1),$$

where $g_R()$ is a softmax function, and $\hat{c}_j$ is a vector obtained by summarization using the inverse attention mechanism, and is obtained using the following function:

$$\hat{c}_j = \sum_{i=1}^{I} \hat{a}_{j,i} \cdot s_i,$$

where $\hat{a}_{j,i}$ is an alignment probability that is output by the inverse attention mechanism, and is obtained using the following function:

$$\hat{a}_{j,i} = \frac{\exp(e_{j,i})}{\sum_{k=1}^{I} \exp(e_{j,k})},$$

where $e_{j,k}$ is an inverse attention mechanism score of an element in the source sequence, and is obtained using the following function:

$$e_{j,k} = a(\hat{h}_{j-1}, s_i; \gamma_2),$$

where $\hat{h}_j$ is an intermediate state used when the reconstruction probability value is obtained, and is obtained using the following function:

$$\hat{h}_j = f_R(x_{j-1}, \hat{h}_{j-1}, \hat{c}_j; \gamma_3),$$

where $x_j$ is an element in the source sequence, and J represents a quantity of elements in the source sequence, $s_i$ represents an element in the decoding intermediate state sequence of the first candidate target sequence, and I represents a quantity of elements in the decoding intermediate state sequence of the first candidate target sequence, $f_R$ is an activation function, and R is the reconstruction probability value, and $\gamma_1$, $\gamma_2$, and $\gamma_3$ are parameters.

Because a source sequence is reconstructed according to a decoding intermediate state sequence when a reconstruction probability value is obtained, and the source sequence is known, the corresponding reconstruction probability value may be obtained according to a specific status of the reconstructed source sequence, and the obtained reconstruction probability value can also reflect accuracy of a candidate target sequence. Therefore, adjusting a translation probability value according to the reconstruction probability value can ensure accuracy of an adjusted translation probability value, thereby improving accuracy of an output target sequence.

With reference to any one of the first aspect or the foregoing implementations of the first aspect, in a possible implementation, the parameters $\gamma_1$, $\gamma_2$, and $\gamma_3$ are obtained by training using an end-to-end learning algorithm.

With reference to any one of the first aspect or the foregoing possible implementations of the first aspect, in a possible implementation, the parameters $\gamma_1$, $\gamma_2$, and $\gamma_3$ are obtained by training using the following function:

$$\arg\max_{\theta, \gamma} \sum_{n=1}^{N} \left\{ \underbrace{\log P(Y_n \mid X_n, \theta)}_{\text{likehood}} + \lambda \underbrace{\log R(X_n \mid s_n, \gamma)}_{\text{reconstruction}} \right\},$$

where $\theta$ and $\gamma$ are neural system parameters that need to be obtained by training, $\gamma$ represents the parameter $\gamma_1$, $\gamma_2$, or $\gamma_3$, N is a quantity of training sequence pairs in a training sequence set, $X_n$ is a source sequence in a training sequence pair, $Y_n$ is a target sequence in the training sequence pair, $s_n$ is a decoding intermediate state sequence used when $X_n$ is converted into $Y_n$, and $\lambda$ is a linearly interpolated value.

With reference to any one of the first aspect or the foregoing possible implementations of the first aspect, in a possible implementation, adjusting a translation probability value of the first candidate target sequence based on the reconstruction probability value of the first candidate target sequence includes summing the translation probability value and the reconstruction probability value of the first candidate target sequence by linear interpolation to obtain an adjusted translation probability value of the first candidate target sequence.

Because the translation probability value and the reconstruction probability value both can reflect accuracy of the corresponding candidate target sequence relative to the source sequence to some extent, the translation probability value and the reconstruction probability value can be balanced well by summing them by linear interpolation, so that the adjusted translation probability value can better reflect the accuracy of the corresponding candidate target sequence, and the output target sequence can better match the source sequence.

With reference to any one of the first aspect or the foregoing possible implementations of the first aspect, in a possible implementation, the source sequence is text in a natural language or a text file that is obtained based on the text in the natural language, and the target sequence is text in an other natural language or a text file that is obtained based on the text in the other natural language, the source sequence is human speech content or a speech data file that is obtained based on the human speech content, and the target sequence is natural language text corresponding to the speech content or a text file that is obtained based on the natural language text, the source sequence is human speech content or a speech data file that is obtained based on the human speech content, and the target sequence is a speech reply to the human speech content or a speech data file that is obtained based on the speech reply, the source sequence is to-be-summarized natural language text, the target sequence is a summary of the to-be-summarized natural language text, and the summary is natural language text or a text file that is obtained based on the natural language text, or the source sequence is an image or an image data file that is obtained based on the image, and the target sequence is a natural language caption of the image or a text file that is obtained based on the natural language caption.

A second aspect of the present disclosure provides a sequence conversion apparatus, including a receiving unit configured to receive a source sequence, a conversion unit configured to convert the source sequence into a source vector representation sequence, an obtaining unit configured to obtain at least two candidate target sequences and a translation probability value of each of the at least two candidate target sequences according to the source vector representation sequence, an adjustment unit configured to adjust the translation probability value of each candidate target sequence, a selection unit configured to select an output target sequence from the at least two candidate target sequences according to an adjusted translation probability value of each candidate target sequence, and an output unit configured to output the output target sequence.

The translation probability value of the candidate target sequence may be adjusted using a preset adjustment factor directly or using a preset adjustment algorithm. Adjusting the translation probability value using the adjustment factor can improve system processing efficiency, and adjusting the translation probability value using the adjustment algorithm can improve accuracy of the adjusted translation probability value.

The source sequence may be further converted into the source vector representation sequence using a word vectorization technology.

With reference to the second aspect, in a possible implementation, the obtaining unit is further configured to obtain at least two source context vectors according to the source vector representation sequence based on an attention mechanism, obtain respective decoding intermediate state sequences of the at least two source context vectors, and obtain respective candidate target sequences of the at least two decoding intermediate state sequences, and the adjustment unit is further configured to adjust the translation probability value based on a decoding intermediate state sequence of each candidate target sequence.

Because a decoding intermediate state sequence can represent translation accuracy of a corresponding candidate target sequence to some extent, adjusting a translation probability value according to the decoding intermediate state sequence can improve accuracy of an adjusted translation probability value, thereby improving accuracy of a final target sequence.

With reference to either of the second aspect or the foregoing possible implementation of the second aspect, in a possible implementation, the at least two candidate target sequences include a first candidate target sequence, and the first candidate target sequence is any one of the at least two candidate target sequences, and the adjustment unit includes an obtaining subunit configured to obtain a reconstruction probability value of the first candidate target sequence based on a decoding intermediate state sequence of the first candidate target sequence, and an adjustment subunit configured to adjust a translation probability value of the first candidate target sequence based on the reconstruction probability value of the first candidate target sequence.

With reference to any one of the second aspect or the possible implementations of the second aspect, in a possible implementation, the obtaining subunit is further configured to obtain the reconstruction probability value of the first candidate target sequence based on an inverse attention mechanism, where an input of the inverse attention mechanism is the decoding intermediate state sequence of the first candidate target sequence, and an output of the inverse attention mechanism is the reconstruction probability value of the first candidate target sequence.

With reference to any one of the second aspect or the possible implementations of the second aspect, in a possible implementation, the obtaining subunit is further configured to obtain the reconstruction probability value of the first candidate target sequence according to the following function:

$$R(x \mid s; \gamma_1) = \prod_{j=1}^{J} g_R(x_{j-1}, \hat{h}_j, \hat{c}_j; \gamma_1),$$

where $g_R( )$ is a softmax function, and $\hat{c}_j$ is a vector obtained by summarization using the inverse attention mechanism, and is obtained b using the following function:

$$\hat{c}_j = \sum_{i=1}^{I} \hat{a}_{j,i} \cdot s_i,$$

where $\hat{a}_{j,i}$ is an alignment probability that is output by the inverse attention mechanism, and is obtained using the following function:

$$\hat{a}_{j,i} = \frac{\exp(e_{j,i})}{\sum_{k=1}^{I} \exp(e_{j,k})},$$

where $e_{j,k}$ is an inverse attention mechanism score of an element in the source sequence, and is obtained using the following function:

$$e_{j,k} = a(\hat{h}_{j-1}, s_i; \gamma_2),$$

where $\hat{h}_j$ is an intermediate state used when the reconstruction probability value is obtained, and is obtained using the following function:

$$\hat{h}_j = f_R(x_{j-1}, \hat{h}_{j-1}, \hat{c}_j; \gamma_3),$$

where $x_j$ is an element in the source sequence, and J represents a quantity of elements in the source sequence, $s_i$ represents an element in the decoding intermediate state sequence of the first candidate target sequence, and I represents a quantity of elements in the decoding intermediate state sequence of the first candidate target sequence, $f_R$ is an activation function, and R is the reconstruction probability value, and $\gamma_1$, $\gamma_2$, and $\gamma_3$ are parameters.

Because a source sequence is reconstructed according to a decoding intermediate state sequence when a reconstruction probability value is obtained, and the source sequence is known, the corresponding reconstruction probability value may be obtained according to a specific status of the reconstructed source sequence, and the obtained reconstruction probability value can also reflect accuracy of a candidate target sequence. Therefore, adjusting a translation probability value according to the reconstruction probability value can ensure accuracy of an adjusted translation probability value, thereby improving accuracy of an output target sequence.

With reference to any one of the second aspect or the possible implementations of the second aspect, in a possible implementation, the apparatus further includes a training unit configured to obtain the parameters $\gamma_1$, $\gamma_2$, and $\gamma_3$ by training using an end-to-end learning algorithm.

With reference to any one of the second aspect or the possible implementations of the second aspect, in a possible implementation, the training unit is further configured to obtain the parameters $\gamma_1$, $\gamma_2$, and $\gamma_3$ by training using the following function:

$$\arg\max_{\theta,\gamma} \sum_{n=1}^{N} \left\{ \underbrace{\log P(Y_n \mid X_n, \theta)}_{likelihood} + \lambda \underbrace{\log R(X_n \mid s_n, \gamma)}_{reconstruction} \right\},$$

where $\theta$ and $\gamma$ are neural system parameters that need to be obtained by training, $\gamma$ represents the parameter $\gamma_1$, $\gamma_2$, and $\gamma_3$, N is a quantity of training sequence pairs in a training sequence set, $X_n$ is a source sequence in a training sequence pair, $Y_n$ is a target sequence in the training sequence pair, $s_n$ is a decoding intermediate state sequence used when $X_n$ is converted into $Y_n$, and $\lambda$ is a linearly interpolated value.

With reference to any one of the second aspect or the possible implementations of the second aspect, in a possible implementation, the adjustment subunit is further configured to sum the translation probability value and the reconstruction probability value of the first candidate target sequence by linear interpolation to obtain an adjusted translation probability value of the first candidate target sequence.

Because the translation probability value and the reconstruction probability value both can reflect accuracy of the corresponding candidate target sequence relative to the source sequence to some extent, the translation probability value and the reconstruction probability value can be balanced well by summing them by linear interpolation, so that the adjusted translation probability value can better reflect the accuracy of the corresponding candidate target sequence, and the output target sequence can better match the source sequence.

With reference to any one of the second aspect or the possible implementations of the second aspect, in a possible implementation, the source sequence is text in a natural language or a text file that is obtained based on the text in the natural language, and the target sequence is text in an other natural language or a text file that is obtained based on the text in the other natural language, the source sequence is human speech content or a speech data file that is obtained based on the human speech content, and the target sequence is natural language text corresponding to the speech content or a text file that is obtained based on the natural language text, the source sequence is human speech content or a speech data file that is obtained based on the human speech content, and the target sequence is a speech reply to the human speech content or a speech data file that is obtained based on the speech reply, the source sequence is to-be-summarized natural language text, the target sequence is a summary of the to-be-summarized natural language text, and the summary is natural language text or a text file that is obtained based on the natural language text, or the source sequence is an image or an image data file that is obtained based on the image, and the target sequence is a natural language caption of the image or a text file that is obtained based on the natural language caption.

A third aspect of the present disclosure provides a sequence conversion apparatus, including a processor and a memory, where the memory stores an executable instruction, and the executable instruction is used to instruct the processor to perform receiving a source sequence, converting the source sequence into a source vector representation sequence, obtaining at least two candidate target sequences and a translation probability value of each of the at least two candidate target sequences according to the source vector representation sequence, adjusting the translation probability value of each candidate target sequence, selecting an output target sequence from the at least two candidate target sequences according to an adjusted translation probability value of each candidate target sequence, and outputting the output target sequence.

The translation probability value of the candidate target sequence may be adjusted using a preset adjustment factor directly or using a preset adjustment algorithm. Adjusting the translation probability value using the adjustment factor can improve system processing efficiency, and adjusting the translation probability value using the adjustment algorithm can improve accuracy of the adjusted translation probability value.

The source sequence may be converted into the source vector representation sequence using a word vectorization technology.

With reference to the third aspect, in a possible implementation, when obtaining at least two candidate target sequences according to the source vector representation sequence, the processor is configured to perform obtaining at least two source context vectors according to the source vector representation sequence based on an attention mechanism, obtaining respective decoding intermediate state sequences of the at least two source context vectors, and obtaining respective candidate target sequences of the at least two decoding intermediate state sequences, and when adjusting the translation probability value of each candidate target sequence, the processor is configured to perform the following step adjusting the translation probability value based on a decoding intermediate state sequence of each candidate target sequence.

Because a decoding intermediate state sequence can represent translation accuracy of a corresponding candidate target sequence to some extent, adjusting a translation probability value according to the decoding intermediate state sequence can improve accuracy of an adjusted translation probability value, thereby improving accuracy of a final target sequence.

With reference to either of the third aspect or the foregoing possible implementation of the third aspect, in a possible implementation, the at least two candidate target sequences include a first candidate target sequence, and the first candidate target sequence is any one of the at least two candidate target sequences, and when adjusting the translation probability value based on a decoding intermediate state sequence of each candidate target sequence, the processor is configured to perform obtaining a reconstruction probability value of the first candidate target sequence based on a decoding intermediate state sequence of the first candidate target sequence, and adjusting a translation probability value of the first candidate target sequence based on the reconstruction probability value of the first candidate target sequence.

With reference to any one of the third aspect or the foregoing possible implementations of the third aspect, in a possible implementation, when converting the source sequence into a source context vector sequence, the processor is configured to perform the following step converting the source sequence into the source context vector sequence based on an attention mechanism, and when obtaining a reconstruction probability value of the first candidate target sequence based on a decoding intermediate state of the first candidate target sequence, the processor is configured to perform obtaining the reconstruction probability value of the first candidate target sequence based on an inverse attention mechanism, where an input of the inverse attention mechanism is the decoding intermediate state sequence of the first candidate target sequence, and an output of the inverse attention mechanism is the reconstruction probability value of the first candidate target sequence.

With reference to any one of the third aspect or the foregoing possible implementations of the third aspect, in a possible implementation, when obtaining the reconstruction probability value of the first candidate target sequence based on an inverse attention mechanism, the processor is configured to perform obtaining the reconstruction probability value of the first candidate target sequence according to the following function:

$$R(x \mid s; \gamma_1) = \prod_{j=1}^{J} g_R(x_{j-1}, \hat{h}_j, \hat{c}_j; \gamma_1),$$

where $g_R(\ )$ is a softmax function, and $\hat{c}_j$ is a vector obtained by summarization using the inverse attention mechanism, and is obtained using the following function:

$$\hat{c}_j = \sum_{i=1}^{I} \hat{\alpha}_{j,i} \cdot s_i,$$

where $\hat{\alpha}_{j,i}$ is an alignment probability that is output by the inverse attention mechanism, and is obtained using the following function:

$$\hat{\alpha}_{j,i} = \frac{\exp(e_{j,i})}{\sum_{k=1}^{I} \exp(e_{j,k})},$$

where $e_{j,k}$ is an inverse attention mechanism score of an element in the source sequence, and is obtained using the following function:

$$e_{j,k} = a(\hat{h}_{j-1}, s_i; \gamma_2),$$

where $\hat{h}_j$ is an intermediate state used when the reconstruction probability value is obtained, and is obtained using the following function:

$$\hat{h}_j = f_R(x_{j-1}, \hat{h}_{j-1}, \hat{c}_j; \gamma_3),$$

where $x_j$ is an element in the source sequence, and J represents a quantity of elements in the source sequence, $s_i$ represents an element in the decoding intermediate state sequence of the first candidate target sequence, and I represents a quantity of elements in the decoding intermediate state sequence of the first candidate target sequence, $f_R$ is an activation function, and R is the reconstruction probability value, and $\gamma_1$, $\gamma_2$, and $\gamma_3$ are parameters.

Because a source sequence is reconstructed according to a decoding intermediate state sequence when a reconstruction probability value is obtained, and the source sequence is known, the corresponding reconstruction probability value may be obtained according to a specific status of the reconstructed source sequence, and the obtained reconstruction probability value can also reflect accuracy of a candidate target sequence. Therefore, adjusting a translation probability value according to the reconstruction probability value can ensure accuracy of an adjusted translation probability value, thereby improving accuracy of an output target sequence.

With reference to any one of the third aspect or the foregoing possible implementations of the third aspect, in a possible implementation, the executable instruction is further used to instruct the processor to perform obtaining the parameters $\gamma_1$, $\gamma_2$, and $\gamma_3$ by training using an end-to-end learning algorithm.

With reference to any one of the third aspect or the foregoing possible implementations of the third aspect, in a possible implementation, the parameters $\gamma_1$, $\gamma_2$, and $\gamma_3$ are obtained by training using the following function:

$$\arg\max_{\theta, \gamma} \sum_{n=1}^{N} \left\{ \underbrace{\log P(Y_n \mid X_n, \theta)}_{likehood} + \lambda \underbrace{\log R(X_n \mid s_n, \gamma)}_{reconstruction} \right\},$$

where $\theta$ and $\gamma$ are neural system parameters that need to be obtained by training, $\gamma$ represents the parameter $\gamma_1$, $\gamma_2$, or $\gamma_3$, N is a quantity of training sequence pairs in a training sequence set, $X_n$ is a source sequence in a training sequence pair, $Y_n$ is a target sequence in the training sequence pair, $s_n$ is a decoding intermediate state sequence used when $X_n$ is converted into $Y_n$, and $\lambda$ is a linearly interpolated value.

With reference to any one of the third aspect or the foregoing possible implementations of the third aspect, in a possible implementation, when adjusting a translation probability value of the first candidate target sequence based on the reconstruction probability value of the first candidate target sequence, the processor is configured to perform summing the translation probability value and the reconstruction probability value of the first candidate target sequence by linear interpolation, to obtain an adjusted translation probability value of the first candidate target sequence.

Because the translation probability value and the reconstruction probability value both can reflect accuracy of the corresponding candidate target sequence relative to the source sequence to some extent, the translation probability value and the reconstruction probability value can be balanced well by summing them by linear interpolation, so that the adjusted translation probability value can better reflect the accuracy of the corresponding candidate target sequence, and the output target sequence can better match the source sequence.

With reference to any one of the third aspect or the foregoing possible implementations of the third aspect, in a possible implementation, the source sequence is text in a natural language or a text file that is obtained based on the text in the natural language, and the target sequence is text in an other natural language or a text file that is obtained based on the text in the other natural language, the source sequence is human speech content or a speech data file that is obtained based on the human speech content, and the target sequence is natural language text corresponding to the speech content or a text file that is obtained based on the natural language text, the source sequence is human speech content or a speech data file that is obtained based on the human speech content, and the target sequence is a speech reply to the human speech content or a speech data file that is obtained based on the speech reply, the source sequence is to-be-summarized natural language text, the target sequence is a summary of the to-be-summarized natural language text, and the summary is natural language text or a text file that is obtained based on the natural language text, or the source sequence is an image or an image data file that is obtained based on the image, and the target sequence is a natural language caption of the image or a text file that is obtained based on the natural language caption.

A fourth aspect of the present disclosure provides a sequence conversion system, including an input interface, an output interface, and the sequence conversion apparatus that is provided in any one of the second aspect, the possible implementations of the second aspect, the third aspect, or the possible implementations of the third aspect of the present disclosure, where the input interface is configured to receive source data and convert the source data into the source sequence, and the output interface is configured to output an output target sequence that is output by the sequence conversion apparatus.

The input interface and the output interface vary according to different specific implementation forms of the sequence conversion system. For example, when the sequence conversion system is a server or is deployed on a cloud, the input interface may be a network interface, the source data comes from a client, and the source data may be a speech data file, an image data file, a text file, or the like collected by the client. Correspondingly, the output interface may also be the network interface configured to output the output target sequence to the client.

When the sequence conversion system is a local device such as a mobile phone or a terminal, the input interface varies according to different types of the source data. For example, when the source data is natural language text, the input interface may be a manual input device such as a keyboard, a mouse, a touchscreen, or a handwriting tablet, and the output interface may be a network interface, a display interface, or the like. When the source data is a human speech, the input interface may be a sound collection device such as a microphone, and the output interface may be a speaker, a network interface, a display interface, or the like (which may vary according to different presentation forms of the output target sequence). When the source data is image data, the input interface may be an image acquisition device such as a camera, and the output interface may be a network interface, a display interface, or the like.

A fifth aspect of the present disclosure provides a computer storage medium configured to store an executable instruction, where when the executable instruction is executed, the method in any one of the first aspect or the possible implementations of the first aspect can be implemented.

It can be learned from the foregoing technical solutions provided in the embodiments of the present disclosure that, in the embodiments of the present disclosure, the translation probability value of the candidate target sequence is adjusted during sequence conversion, so that the adjusted translation probability value can better reflect the degree of matching between the target sequence and the source sequence. Therefore, when the output candidate target sequence is selected according to the adjusted translation probability value, a selected output target sequence can better match the source sequence, so that the obtained target sequence can be more loyal to the source sequence, thereby improving accuracy of the target sequence relative to the source sequence.

BRIEF DESCRIPTION OF DRAWINGS

To describe the technical solutions in the embodiments of the present disclosure more clearly, the following briefly describes the accompanying drawings describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
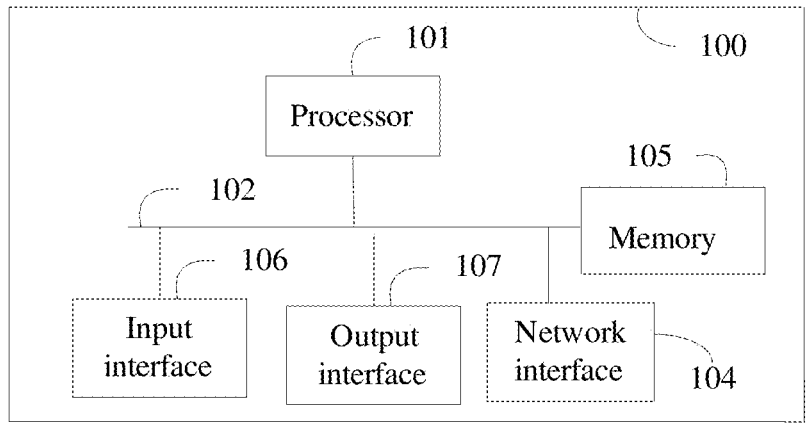
FIG. 1 is a structural diagram of a computer according to the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a sequence conversion method, which may be applied to any application scenario requiring sequence conversion, such as machine translation, speech recognition, a dialog system, automatic summarization, automatic question answering, or image caption generation.

Machine translation (MT) belongs to a sub-field of computational linguistics that investigates use of a computer program to translate text or a speech from one natural language to another natural language. The natural language is usually a language that naturally evolves with culture. For example, English, Chinese, French, Spanish, and Japanese are all natural languages. Input natural language text may be manually entered by a user using a manual input device such as a keyboard, a mouse, a touchscreen, or a handwriting tablet, or may be input by a remote device using a network. Output natural language text may be directly presented using a display, or may be output to the remote device using the network and presented by the remote device.

Speech recognition is converting human speech content into natural language text using a computer. Input human speech content may be collected and then input by a sound collection device such as a microphone, or may be collected by a remote device and then input using a network. Output natural language text may be directly presented using a display, or may be output to the remote device using the network and presented by the remote device.

The dialog system makes a speech dialog with a human using a computer, human speech content is input to the dialog system, and a speech reply corresponding to input speech content is output from the dialog system. The input human speech content may be collected by a sound collection device such as a microphone and then input, or may be collected by a remote device and then input using a network. The output speech reply may be directly presented using an audio playing device such as a speaker, or may be output to the remote device using the network and presented by the remote device.

Automatic question answering is answering a human speech-based question using a computer. An input and an output of automatic question answering may be similar to those of the dialog system. Details are not described herein again.

Application scenarios related to current mainstream commercial speech assistants include speech recognition, the dialog system, automatic question answering, and the like.

Automatic summarization is generating a general idea of a paragraph of natural language text using a computer, and is usually used to provide a summary of an article in a known field, for example, to generate a summary of an article on a newspaper. An input paragraph of natural language text may be manually entered by a user using a manual input device such as a keyboard, a mouse, a touchscreen, or a handwriting tablet, or may be input by a remote device using a network, or may be input by recognition using an optical character recognition (OCR) technology. An output summary includes natural language text, and may be directly presented using a display, or may be output to the remote device using the network and presented by the remote device.

Image caption generation is generating a caption of an image using a computer. An input image may be collected by a remote device and then input using a network, or may be collected and input by an image acquisition device such as a camera. An output caption includes natural language text, and may be directly presented using a display, or may be output to the remote device using the network and presented by the remote device.

The sequence conversion method provided in the embodiments of the present disclosure may be implemented using a computer, and may be further implemented using a general-purpose computer or a dedicated computer, or may be implemented using a computer cluster, or certainly may be implemented by a cloud. It may be understood that, regardless of which one of the manners is used for implementation, it may be ultimately considered that a computer is used for implementation. FIG. 1 illustrates a structure of a computer 100, including at least one processor 101, at least one network interface 104, a memory 105, and at least one communications bus 102 configured to implement connection and communication between these apparatuses. The processor 101 is configured to execute an executable module stored in the memory 105, to implement the sequence conversion method in the present disclosure. The executable module may be a computer program. According to a function of the computer 100 in a system and an application scenario of the sequence conversion method, the computer 100 may further include at least one input interface 106 and at least one output interface 107.

The input interface 106 and the output interface 107 vary according to different application scenarios of the sequence conversion method. For example, when the sequence conversion method is applied to machine translation, if input natural language text is manually entered by a user using a manual input device such as a keyboard, a mouse, a touchscreen, or a handwriting tablet, the input interface 106 needs to include an interface for communication with the manual input device such as the keyboard, the mouse, the touchscreen, or the handwriting tablet. If output natural language text is directly presented using a display, the output interface 107 needs to include an interface for communication with the display.

When the sequence conversion method is applied to speech recognition, if input human speech content is collected by a sound collection device such as a microphone and then input, the input interface 106 needs to include an interface for communication with the sound collection device such as the microphone. If output natural language text is directly presented using a display, the output interface 107 needs to include an interface for communication with the display.

When the sequence conversion method is applied to the dialog system, if input human speech content is collected by a sound collection device such as a microphone and then input, the input interface 106 needs to include an interface for communication with the sound collection device such as the microphone. If an output speech reply is directly presented using an audio playing device such as a speaker, the output interface 107 needs to include an interface for communication with the audio playing device such as the speaker.

When the sequence conversion method is applied to automatic question answering, if input human speech content is collected by a sound collection device such as a microphone and then input, the input interface 106 needs to include an interface for communication with the sound collection device such as the microphone. If an output speech reply is directly presented using an audio playing device such as a speaker, the output interface 107 needs to include an interface for communication with the audio playing device such as the speaker.

When the sequence conversion method is applied to automatic summarization, if an input paragraph of natural language text is manually entered by a user using a manual input device such as a keyboard, a mouse, a touchscreen, or a handwriting tablet, the input interface 106 needs to include an interface for communication with the manual input device such as the keyboard, the mouse, the touchscreen, or the handwriting tablet. If an input paragraph of natural language text is input by recognition by an OCR module, the output interface 107 needs to include an interface for communication with the OCR module. If an output summary is directly presented using a display, the output interface 107 needs to include an interface for communication with the display.

When the sequence conversion method is applied to image caption generation, if an input image is collected and input by an image acquisition device such as a camera, the input interface 106 needs to include an interface for communication with the image acquisition device such as the camera. If an output caption is directly presented using a display, the output interface 107 needs to include an interface for communication with the display.

Figure 2:
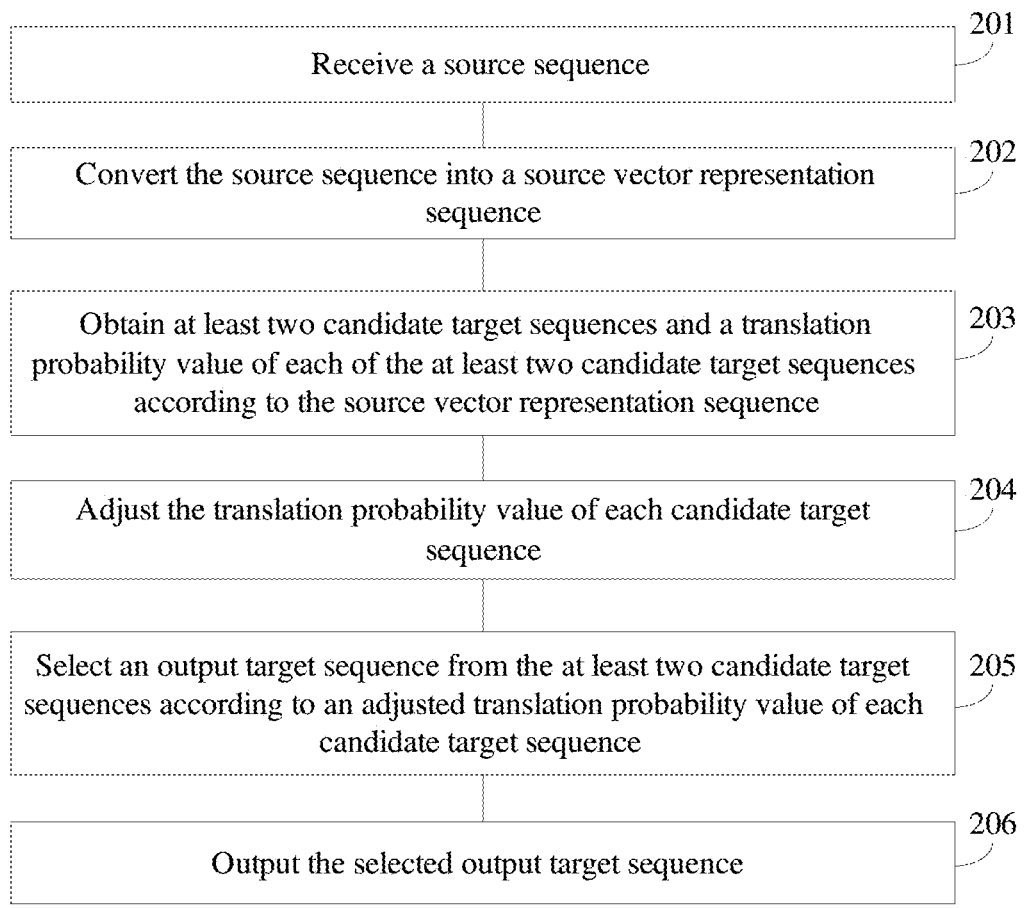
FIG. 2 is a flowchart of a sequence conversion method according to an embodiment of the present disclosure.

The following first describes a sequence conversion method provided in an embodiment of the present disclosure. FIG. 2 illustrates a procedure of a sequence conversion method according to an embodiment of the present disclosure. The method may be implemented based on an RNN technology. As shown in FIG. 2, the method includes the following steps.

Step 201. Receive a source sequence.

The source sequence varies according to different application scenarios. For example, when applied to machine translation, the source sequence is natural language text, and may be a phrase, or may be a sentence, or even may be a paragraph of text. When applied to speech recognition, the source sequence is a section of human speech content. When applied to a dialog system, the source sequence is a section of human speech content. When applied to automatic question answering, the source sequence is a section of human speech content. When applied to automatic summarization, the source sequence is a to-be-summarized paragraph of natural language text. When applied to image caption generation, the source sequence is an image for which a caption is to be generated.

A specific process of receiving a source sequence is already described in detail above, and details are not described herein again.

In the following embodiment description, the source sequence is represented by $(x_1, x_2, x_3, \ldots, x_J)$, where J is a quantity of elements in the source sequence.

Step 202. Convert the source sequence into a source vector representation sequence.

There may be one or more elements (source vector representations) in the source vector representation sequence. A specific quantity varies according to a status of the source sequence and different used conversion algorithms.

In an implementation, the source sequence $(x_1, x_2, x_3, \ldots, x_J)$ may be converted into a source vector representation sequence $(h_1, h_2, h_3, \ldots, h_J)$ using an RNN. The source sequence may be converted into the source vector representation sequence using a word vectorization technology.

In an application scenario of machine translation, when the source sequence is converted into the source vector representation sequence, a word vectorization manner may be used. Word vectorization means automatically learning a meaning of each word according to a context by learning a large amount of text (no callout is required), and then mapping each word to an expression in a real number vector form. In this case, each word vector is converted into a source vector representation, for example, vec (China) subtracted by vec (Beijing) is approximately equal to vec (United Kingdom) subtracted by vec (London). Based on a word vector, a sentence may be extensibly mapped to a vector, or even a paragraph of text may be mapped to a vector.

It may be understood that, in an application scenario other than machine translation, the source sequence may be converted into the source vector representation sequence in a manner similar to a word vectorization.

Step 203. Obtain at least two candidate target sequences and a translation probability value of each of the at least two candidate target sequences according to the source vector representation sequence.

The candidate target sequence and the translation probability value of the candidate target sequence may be obtained using the RNN.

In a possible implementation, at least two source context vectors may be obtained according to the source vector representation sequence based on an attention mechanism, then respective decoding intermediate state sequences of the at least two source context vectors may be obtained, and then respective candidate target sequences of the at least two decoding intermediate state sequences may be obtained.

When the source vector representation sequence $(h_1, h_2, h_3, \ldots, h_J)$ is converted into a source context vector $(c_1, c_2, \ldots, c_I)$ based on the attention mechanism, a weight (the weight may be obtained by automatic learning in a training corpus) may be assigned to each vector in the source vector representation sequence $(h_1, h_2, h_3, \ldots, h_J)$ using the attention mechanism. The weight represents a probability of alignment between a vector in the source vector representation sequence $(h_1, h_2, h_3, \ldots, h_J)$ and a to-be-generated target word. A sequence including vectors that are obtained by weighting each vector in the source vector representation sequence is a source context sequence. I and J may have different values.

In some other implementations, a last vector in the source vector representation sequence may be used as a source context vector. Alternatively, the attention mechanism may be used to summarize, in a weighted sum manner, all vectors in the source vector representation sequence into a source context vector at different decoding moments according to a specific requirement. Alternatively, a convolutional neural network may be used to summarize the source sequence into a source context vector.

In some implementations, a specific process of obtaining a target word in a candidate target sequence may include the following two steps.

1. Update a current decoding intermediate state. The decoding intermediate state is a summary of past translation information, and may be updated using a general RNN model. An input of the update step includes a current source context vector $(c_i)$, a previous decoding intermediate state $(s_{i-1})$, and a previous target word $(y_{i-1})$. An output of the update step includes a current decoding intermediate state $(s_i)$. It should be noted that, when the current decoding intermediate state is $s_1$, because no previous decoding intermediate state can be input, in an actual implementation process, an initial decoding intermediate state may be preset. Information carried in the initial decoding intermediate state may be blank (that is, all zeros), or may be preset information.

2. Generate a current target word. An input of the generation step includes the current source context vector $(c_i)$, the current decoding intermediate state $(s_i)$, and the previous target word $(y_{i-1})$. An output of the generation step includes a current target word $(y_i)$ and a translation probability value. The translation probability value represents a degree of matching between a corresponding target word and a source context vector. According to different specific algorithms, the translation probability value is expected to be as large as possible, or as small as possible, or as close as possible to a preset reference value. It should be noted that, when the current target word is $y_1$, because no previous target word can be input, in an actual implementation process, an initial target word may be preset. Information carried in the initial target word may be blank (that is, all zeros), or may be preset information.

After each target word in a target sequence is determined, translation probability values corresponding to all the target words may be directly multiplied to obtain a translation probability value of the target sequence. Alternatively, translation probability values corresponding to all the target words may be multiplied to obtain a product, and then the product may be normalized based on a quantity of the target words to obtain a value as a translation probability value of the target sequence.

It may be understood that, the foregoing two steps may be cyclically performed a plurality of times, and a quantity of times for which the steps are cyclically performed varies according to different quantities of elements (that is, source context vectors) in a source context vector sequence.

A representation form of an element in the target sequence varies according to different representation forms of the target sequence. For example, when the target sequence is a natural language text sequence, the representation form of the element in the target sequence may be a word vector, corresponding to one target word or one target word group.

A specific process of obtaining a target sequence varies according to different application scenarios, and in each application scenario, there is a mainstream general technology that can be used. A specific prediction method is not limited in the present disclosure.

It should be noted that, the at least two candidate target sequences may be obtained in parallel, that is, the at least two candidate target sequences may be obtained simultaneously, or may be obtained in series, that is, one candidate target sequence is obtained after another candidate target sequence is obtained. A specific obtaining order is not limited in this embodiment of the present disclosure, and implementation of this embodiment of the present disclosure is not affected, provided that the at least two candidate target sequences can be obtained.

Step 204. Adjust the translation probability value of each candidate target sequence.

The translation probability value of the candidate target sequence may be adjusted in a preset manner. In a possible implementation, some adjustment factors are preset, and when the translation probability value is adjusted, the translation probability value may be directly adjusted using these preset adjustment factors, to obtain an adjusted translation probability value. In another possible implementation, an adjustment factor obtaining algorithm is preset, an input of the obtaining algorithm may be the candidate target sequence or the translation probability value of the candidate target sequence, or may be some intermediate information in a process of obtaining the candidate target sequence, and the intermediate information may be a decoding intermediate state sequence, and/or a target sequence, and the like. In an implementation of the present disclosure, the intermediate information may be a decoding intermediate state sequence, the decoding intermediate state sequence and the candidate target sequence are in a one-to-one correspondence, and the decoding intermediate state sequence includes a decoding intermediate state obtained when the corresponding candidate target sequence is obtained.

Adjusting the translation probability value using the adjustment factors can improve system processing efficiency, and adjusting the translation probability value using the adjustment algorithm can further improve adjustment accuracy, thereby improving a degree of matching between an output target sequence and the source sequence.

It should be noted that, when translation probability values of the at least two candidate target sequences are adjusted, the at least two translation probability values may be adjusted simultaneously, or one translation probability value may be adjusted after another translation probability value is adjusted. A specific adjustment order is not limited in this embodiment of the present disclosure.

Step 205. Select an output target sequence from the at least two candidate target sequences according to an adjusted translation probability value of each candidate target sequence.

Because a translation probability value represents a degree of matching between a corresponding candidate target sequence and the source sequence (higher loyalty and higher fluency indicate a higher degree of matching), when the output target sequence is selected from the at least two candidate target sequences, according to a correspondence between a magnitude of a translation probability value and a degree of matching, a candidate target sequence having a largest translation probability value may be directly selected, or a candidate target sequence having a smallest translation probability value may be directly selected, or a candidate target sequence having a translation probability value closest to a preset reference value may be directly selected.

Step 206. Output the selected output target sequence.

A specific output process varies according to different application scenarios, and in each application scenario, there is a mainstream general technology that can be used. A specific output method is not limited in the present disclosure.

It can be learned from above that in the present disclosure, a translation probability value of a candidate target sequence is adjusted during sequence conversion such that an adjusted translation probability value can better reflect a degree of matching between a target sequence and a source sequence. Therefore, when an output candidate target sequence is selected according to the adjusted translation probability value, a selected output target sequence can better match the source sequence such that the obtained target sequence can be more loyal to the source sequence while fluency is not affected, thereby improving accuracy of the target sequence relative to the source sequence. The accuracy includes loyalty and fluency.

A neuron is a simplest neural network. The neural network has been a research hotspot in the artificial intelligence field since 1980s. The neural network abstracts a human brain neuron network from an information processing perspective, to establish a simple model and construct different networks in different connection manners. In engineering and academia, usually, the neural network is also directly briefly referred to as a neural network or an artificial neural network. The neural network is a computing model, and includes a large quantity of interconnected neurons (nodes). Each node represents a specific output function, referred to as an activation function (activation function). A connection between every two nodes represents a weighted value, referred to as a weight, for a signal transmitted through the connection, and is equivalent to memory of the artificial neural network. A network output varies according to different network connection manners, weight values, and activation functions.

Figure 3:
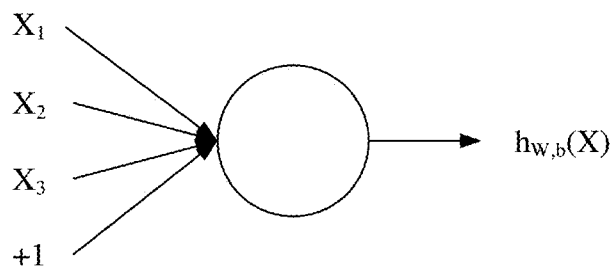
FIG. 3 is a structural diagram of a neuron according to the present disclosure.

FIG. 3 illustrates a structure of a neuron. As shown in FIG. 3, the neuron is a computing unit having input values $x_1$, $x_2$, $x_3$, and an intercept of +1. A specific representation form of the neuron may be an activation function. For example, an output of the neuron shown in FIG. 3 may be represented in a form of the following function (1):

$$h_{W,b}(x) = f(W^T x) = f(\Sigma_{i=1}^{3} W_i x_i + b), \tag{1}$$

where $W_i$ is a weight vector, b is a bias unit, and a function f is an activation function. In some implementations, the activation function may be implemented using a sigmoid function. A typical representation form of the sigmoid function is the following function (2):

$$f(z) = \frac{1}{1 + \exp(-z)}. \tag{2}$$

During sequence-to-sequence conversion related to natural language text processing, a length of a source sequence and a length a target sequence are both unfixed. In an embodiment of the present disclosure, an RNN is used to process the variable-length source sequence and target sequence. A main idea of the RNN is cyclically compressing an input sequence into a fixed-dimension vector. The fixed-dimension vector is also referred to as an intermediate state. The RNN cyclically reads the input sequence, computes, according to a current source context vector and a previous decoding intermediate state, a decoding intermediate state corresponding to the current source context vector, and then predicts, according to the current decoding intermediate state and the current source context vector, a target word corresponding to the current source context vector. In an embodiment of the present disclosure, a decoding intermediate state corresponding to a current source context vector may be alternatively computed using the current source context vector, a previous decoding intermediate state, and a previous target word, and then a target word corresponding to the current source context vector is predicted according to the current decoding intermediate state, the current source context vector, and the previous target word. Finally, a final target sequence may be obtained according to all obtained target words.

Figure 4:
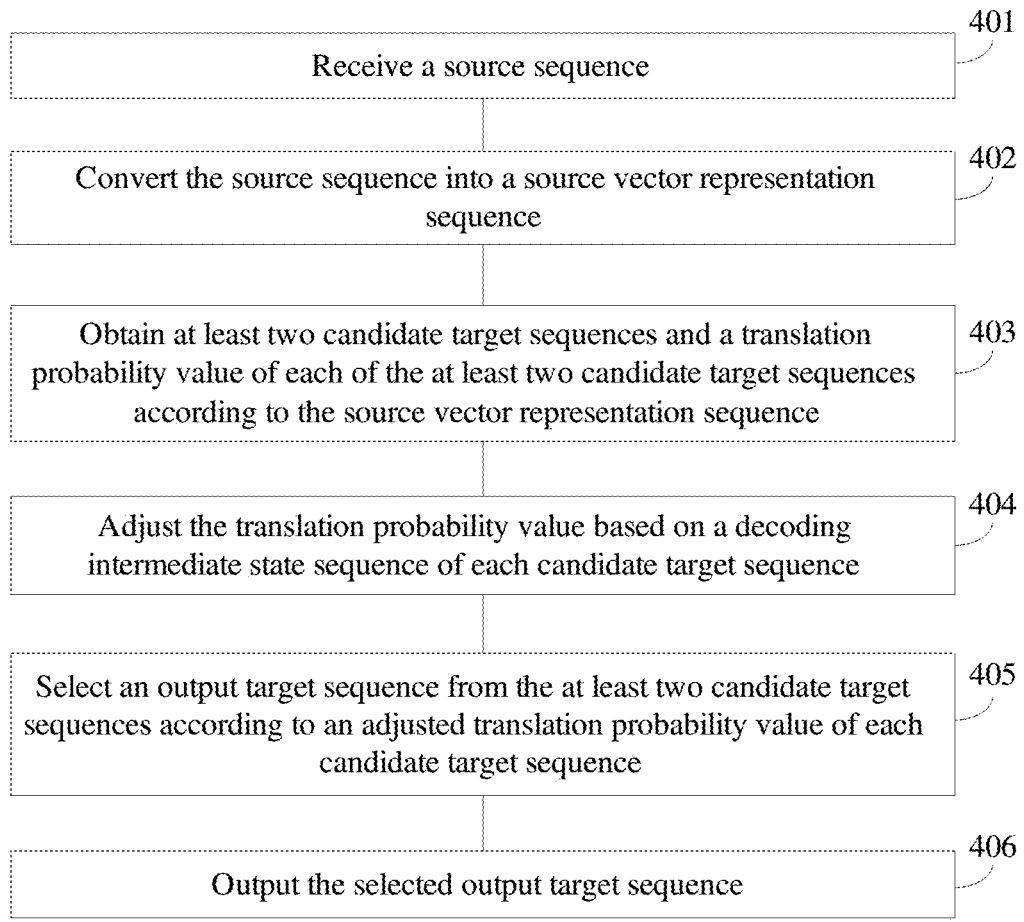
FIG. 4 is a flowchart of a sequence conversion method according to another embodiment of the present disclosure.

FIG. 4 illustrates a procedure of a sequence conversion method according to another embodiment of the present disclosure, including the following steps.

Step 401. Receive a source sequence.

Step 402. Convert the source sequence into a source vector representation sequence.

Step 403. Obtain at least two candidate target sequences, and a translation probability value and a decoding intermediate state sequence of each of the at least two candidate target sequences according to the source vector representation sequence.

For specific implementations of steps 401 to 403, refer to specific implementations of steps 201 to 203. Details are not described herein again.

Step 404. Adjust the translation probability value based on the decoding intermediate state sequence of each candidate target sequence.

The translation probability value may be adjusted according to a preset method.

Figure 5:
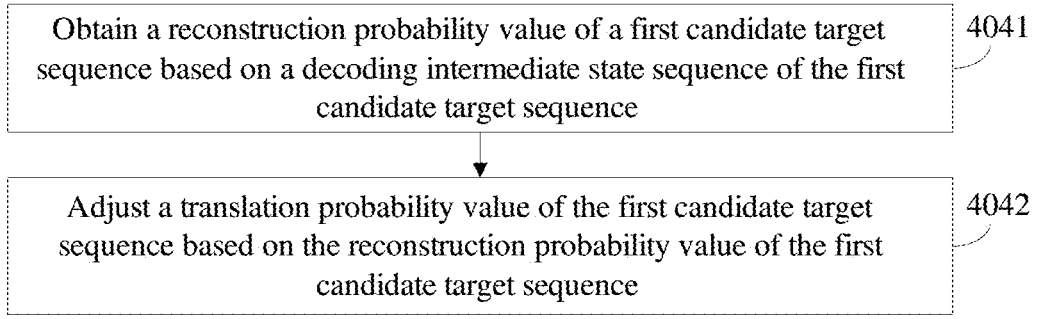
FIG. 5 is a flowchart of an adjustment method according to an embodiment of the present disclosure.

For example, FIG. 5 illustrates a procedure of an adjustment method according to an embodiment of the present disclosure, including the following steps.

Step 4041. Obtain a reconstruction probability value of a first candidate target sequence based on a decoding intermediate state sequence of the first candidate target sequence, where the first candidate target sequence is any one of the at least two candidate target sequences.

The reconstruction probability value may be obtained using an attention mechanism. For example, a mainstream inverse attention mechanism may be used to obtain the reconstruction probability value.

When the reconstruction probability value is obtained using the inverse attention mechanism, the decoding intermediate state sequence $(s_1, s_2, \ldots, s_J)$ of the first candidate target sequence may be used as an input of the inverse attention mechanism, and an output of the inverse attention mechanism is the reconstruction probability value of the first candidate target sequence. Reconstruction means inversely decoding the decoding intermediate state sequence $(s_1, s_2, \ldots, s_J)$ to the source sequence $(x_1, x_2, \ldots, x_J)$ forcibly. Because the source sequence is known, a reconstruction probability value for inversely decoding the decoding intermediate state sequence $(s_1, s_2, \ldots, s_J)$ to the source sequence $(x_1, x_2, \ldots, x_J)$ forcibly can be determined. In a specific reconstruction process, J reconstruction probability values for reconstructing $x_1, x_2, \ldots,$ and $x_J$ can be respectively obtained, and then a final reconstruction probability value is obtained based on the J reconstruction probability values. The reconstruction probability value represents a degree of matching between the decoding intermediate state sequence and the source sequence. Specifically, a larger reconstruction probability value may indicate a higher degree of matching, or a smaller reconstruction probability value may indicate a higher degree of matching, or a reconstruction probability value closer to a preset reference value may indicate a higher degree of matching.

In an implementation, the reconstruction probability value of the first candidate target sequence may be obtained using the following function (3):

$$R(x \mid s; \gamma_1) = \prod_{j=1}^{J} g_R(x_{j-1}, \hat{h}_j, \hat{c}_j; \gamma_1), \tag{3}$$

where $g_R(\ )$ is a softmax function. All word vectors in a reconstructed source sequence may be normalized according to the softmax function to obtain a reconstruction probability value of each word vector, and then the reconstruction probability value of the first candidate target sequence can be determined using the function (3). The softmax function is a general function in a neural network, and is not further described herein.

$\hat{c}_j$ is a vector obtained by summarization using the inverse attention mechanism, and may be obtained using the following function (4):

$$\hat{c}_j = \sum_{i=1}^{I} \hat{a}_{j,i} \cdot s_i, \tag{4}$$

where $\hat{a}_{j,i}$ is an alignment probability that is output by the inverse attention mechanism, and may be obtained using the following function (5):

$$\hat{a}_{j,i} = \frac{\exp(e_{j,i})}{\sum_{k=1}^{I} \exp(e_{j,k})}, \tag{5}$$

where $e_{j,k}$ is an inverse attention mechanism score of an element in the source sequence, and may be obtained using the following function (6):

$$e_{j,k} = a(\hat{h}_{j-1}, s_i; \gamma_2), \tag{6}$$

where $\hat{h}_j$ is an intermediate state in a reconstruction process, and may be obtained using the following function (7):

$$\hat{h}_j = f_R(x_{j-1}, \hat{h}_{j-1}, \hat{c}_j; \gamma_3) \tag{7}$$

where $x_j$ is an element in the source sequence, and J represents a quantity of elements in the source sequence, $s_i$ represents an element in the decoding intermediate state sequence of the first candidate target sequence, and I represents a quantity of elements in the decoding intermediate state sequence of the first candidate target sequence, $f_R$ is an activation function, and R is the reconstruction probability value, and $\gamma_1$ is a parameter of the function (3), $\gamma_2$ is a parameter of the function (6), and $\gamma_3$ is a parameter of the function (7). In some embodiments, $\gamma_1$, $\gamma_2$, and $\gamma_3$ may be different parameters. In some implementations, $\gamma_1$, $\gamma_2$, and $\gamma_3$ may be partially different parameters. In some implementations, $\gamma_1$, $\gamma_2$, and $\gamma_3$ may be same parameters. $\gamma_2$, and $\gamma_3$ may be obtained by training using an end-to-end learning algorithm. A specific end-to-end learning algorithm may be preset.

Step 4042. Adjust a translation probability value of the first candidate target sequence based on the reconstruction probability value of the first candidate target sequence.

The translation probability value and the reconstruction probability value of the first candidate target sequence may be summed by linear interpolation to obtain an adjusted translation probability value of the first candidate target sequence. In some implementations, a sum result obtained by linear interpolation may be directly used as the adjusted translation probability value. In some implementations, a sum result obtained by linear interpolation may be further processed, and a result obtained after processing is used as the adjusted translation probability value. Alternatively, the translation probability value and the reconstruction probability value of the first candidate target sequence may be summed by weighted averaging, to obtain an adjusted translation probability value of the first candidate target sequence. Alternatively, the translation probability value and the reconstruction probability value of the first candidate target sequence may be directly added up, and an obtained sum is used as an adjusted translation probability value of the first candidate target sequence.

Because the translation probability value and the reconstruction probability value both can reflect accuracy of the corresponding candidate target sequence relative to the source sequence to some extent, the translation probability value and the reconstruction probability value can be balanced well by summing them by linear interpolation, so that the adjusted translation probability value can better reflect the accuracy of the corresponding candidate target sequence, and a finally obtained target sequence can better match the source sequence.

Steps 4041 and 4042 may be performed once for each candidate target sequence, that is, a quantity of times for which steps 4041 and 4042 are cyclically performed is equal to a quantity of candidate target sequences, so that an adjusted translation probability value of each candidate target sequence is obtained.

Step 405. Select an output target sequence from the at least two candidate target sequences according to an adjusted translation probability value of each candidate target sequence.

Step 406. Output the selected output target sequence.

For specific implementations of steps 405 and 406, refer to specific implementations of steps 205 and 206. Details are not described herein again.

It can be learned from above that in this embodiment, a translation probability value of a candidate target sequence is adjusted during sequence conversion, so that an adjusted translation probability value can better reflect a degree of matching between a target sequence and a source sequence.

Therefore, when an output candidate target sequence is selected according to the adjusted translation probability value, a selected output target sequence can better match the source sequence, so that the obtained target sequence can be more loyal to the source sequence, thereby improving accuracy of the target sequence relative to the source sequence. In addition, because the candidate target sequence needs to be obtained based on a corresponding decoding intermediate state sequence, adding a step of obtaining the decoding intermediate state sequence of each candidate target sequence does not substantially increase processing load of a sequence conversion apparatus. In addition, because the decoding intermediate state sequence can represent translation accuracy of the corresponding candidate target sequence to some extent, adjusting the translation probability value according to the decoding intermediate state sequence can improve accuracy of the adjusted translation probability value, thereby improving accuracy of a final target sequence.

As described above, the parameters $\gamma_1$, $\gamma_2$, and $\gamma_3$ are obtained by training using the end-to-end learning algorithm. In an implementation of the present disclosure, the parameters $\gamma_1$, $\gamma_2$, and $\gamma_3$ may be obtained by training using the following function (8):

$$\arg\max_{\theta,\gamma} \sum_{n=1}^{N} \left\{ \underbrace{\log P(Y_n \mid X_n, \theta)}_{likelihood} + \lambda \underbrace{\log R(X_n \mid s_n, \gamma)}_{reconstruction} \right\}, \quad (8)$$

where $\theta$ and $\gamma$ are neural system parameters that need to be obtained by training, $\gamma$ represents the parameter $\gamma_1$, $\gamma_2$, or $\gamma_3$, N is a quantity of training sequence pairs in a training sequence set, $X_n$ is a source sequence in a training sequence pair, $Y_n$ is a target sequence in the training sequence pair, $s_n$ is a decoding intermediate state sequence used when $X_n$ is converted into $Y_n$, and $\lambda$ is a linearly interpolated value. $\lambda$ may be set manually in advance, or may be obtained by training through function control. It can be learned that, the function (8) includes two parts a (likelihood) probability and a reconstruction probability. The likelihood probability can be used to evaluate translation fluency well, and the reconstruction probability can be used to evaluate translation loyalty. Translation quality can be evaluated better using the likelihood probability and the reconstruction probability in combination, thereby effectively guiding parameter training to generate a better translation result. A specific representation form of a training sequence pair varies according to different specific application scenarios of the sequence conversion method. For example, when an application scenario is machine translation, each training sequence pair is a pair of natural language sentences that are a translation of the peer.

In some implementations, to better reconstruct decoding intermediate states into the source sequence during sequence conversion, when the parameters $\gamma_1$, $\gamma_2$, and $\gamma_3$ are obtained by training, a decoder intermediate state may be required to include source information as complete as possible, to improve loyalty of a target sequence.

Figure 6:
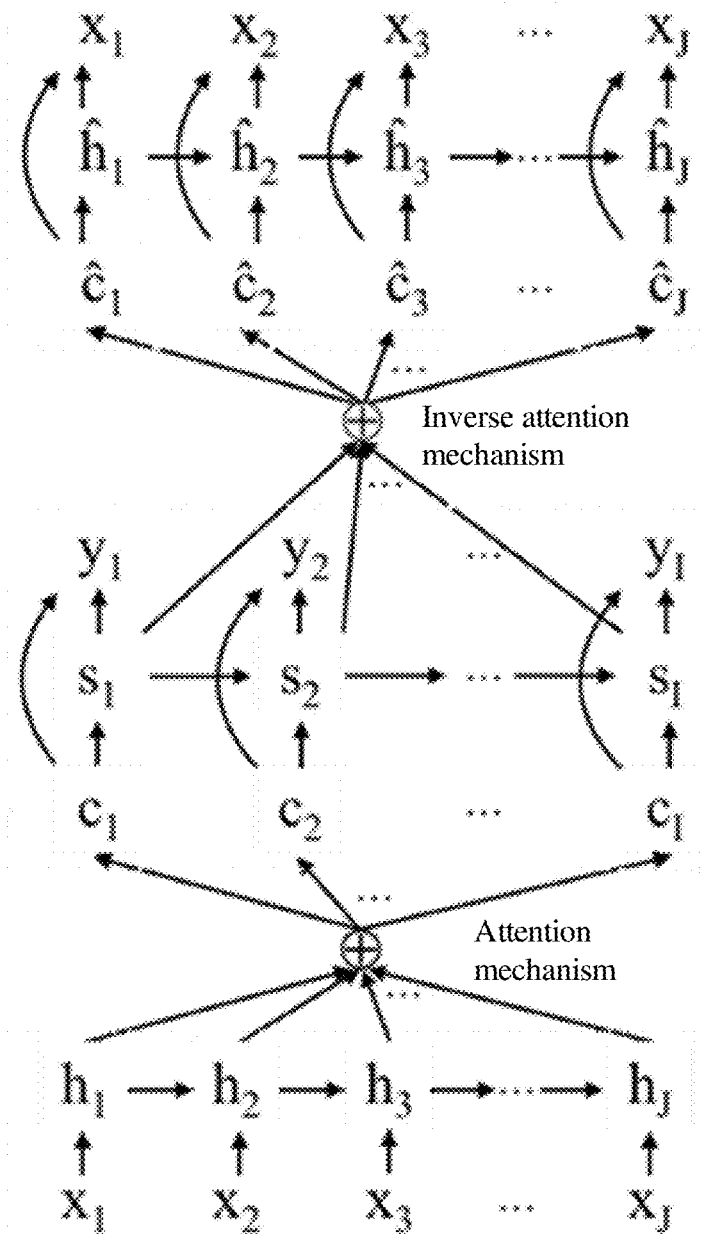
FIG. 6 is a flowchart of sequence conversion in a sequence conversion method according to an embodiment of the present disclosure.

FIG. 6 illustrates a procedure of sequence conversion in a sequence conversion method according to an embodiment of the present disclosure. As shown in FIG. 6, a process of performing the sequence conversion method in the present disclosure includes the following sequence conversion.

A. A source sequence $(x_1, x_2, x_3, \ldots, x_J)$ is first converted into a source vector representation sequence $(h_1, h_2, h_3, \ldots, h_I)$. This process may be implemented using a word vectorization technology.

B. The source vector representation sequence $(h_1, h_2, h_3, \ldots, h_I)$ is converted into a source context vector $(c_1, c_2, \ldots, c_I)$ using an attention mechanism. It should be noted that I and J may have same or different values.

C. A corresponding decoding intermediate state sequence $(s_1, s_2, \ldots, s_I)$ is obtained using the source context vector $(c_1, c_2, \ldots, c_I)$. It can be learned from the figure that, a current decoding intermediate state $s_i$ is obtained with reference to a previous decoding intermediate state where $1 \le i \le I$. It should be noted that, because no previous decoding intermediate state can be used for reference when a decoding intermediate state $s_1$ is obtained, a preset initial decoding intermediate state may be used for reference in this case. The initial decoding intermediate state may carry blank information (that is, all zeros), or may be preset information. Carried information is not limited in this embodiment of the present disclosure.

D. A candidate target sequence $(y_1, y_2, \ldots, y_J)$ is obtained based on the decoding intermediate state sequence $(s_1, s_2, \ldots, s_I)$ and the source context vector sequence $(c_1, c_2, \ldots, c_I)$. In addition, a translation probability value of the candidate target sequence $(y_1, y_2, \ldots, y_J)$ is output in this step. In a process of obtaining the target sequence $(y_1, y_2, \ldots, y_J)$, a translation probability value 1 of obtaining a target word $y_1$ using $s_1$ and $c_1$, a translation probability value 2 of obtaining a target word $y_2$ using $s_2$ and $c_2$, . . . , and a translation probability value J of obtaining a target word $y_J$ using $s_J$ and $c_J$ may be computed separately, and then the translation probability value of the candidate target sequence $(y_1, y_2, \ldots, y_J)$ may be obtained based on the obtained translation probability value 1, translation probability value 2, . . . , and translation probability value J. The translation probability value 1, the translation probability value 2, . . . , and the translation probability value J may be multiplied to obtain a final translation probability value. Alternatively, after a product of the translation probability value 1, the translation probability value 2, . . . , and the translation probability value J is obtained, the product may be normalized based on a value of J to obtain a final translation probability value.

E. The decoding intermediate state sequence $(S_1, s_2, \ldots, s_I)$ is converted into a reconstructed source context vector $(\hat{c}_1, \hat{c}_2, \ldots, \hat{c}_J)$ based on an inverse attention mechanism.

F. A reconstructed intermediate state sequence $(\hat{h}_1, \hat{h}_2, \ldots, \hat{h}_J)$ is obtained based on the reconstructed source context vector $(\hat{c}_1, \hat{c}_2, \ldots, \hat{c}_J)$. As shown in FIG. 6, a current reconstructed source vector representation $\hat{h}_j$ is obtained with reference to a previous reconstructed intermediate state $\hat{h}_{j-1}$, where $1 \le j \le J$. It should be noted that, because no previous reconstructed intermediate state can be used for reference when a reconstructed intermediate state $\hat{h}_1$ is obtained, a preset initial reconstructed intermediate state may be used for reference in this case. The initial reconstructed intermediate state may carry blank information (that is, all zeros), or may be preset information. Carried information is not limited in this embodiment of the present disclosure.

G. The source sequence $(x_1, x_2, x_3, \ldots, x_J)$ is obtained based on the reconstructed intermediate state sequence $(\hat{h}_1, \hat{h}_2, \ldots, \hat{h}_J)$ and the reconstructed source context vector $(\hat{c}_1, \hat{c}_2, \ldots, \hat{c}_J)$. Because the source sequence $(x_1, x_2, x_3, \ldots, x_J)$ is known, when the source sequence $(x_1, x_2, x_3, \ldots, x_J)$ is output using the reconstructed intermediate state sequence $(\hat{h}_1, \hat{h}_2, \ldots, \hat{h}_J)$ and the reconstructed source context vector $(\hat{c}_1, \hat{c}_2, \ldots, \hat{c}_J)$, a reconstruction probability value 1 of obtaining $x_1$ using $\hat{c}_1$ and $\hat{h}_1$, a reconstruction probability value 2 of obtaining $x_2$ using $\hat{c}_2$ and $\hat{h}_2$, . . . , and a reconstruction probability value J of obtaining $x_J$ using $\hat{c}_J$ and $\hat{h}_J$ may be computed separately, and then a reconstruction probability value of reconstructing the source sequence using the decoding intermediate state sequence may be obtained based on the obtained reconstruction probability value 1, reconstruction probability value 2, . . . , and reconstruction probability value J. The reconstruction probability value 1, the reconstruction probability value 2, . . . , and the reconstruction probability value J may be multiplied to obtain a final reconstruction probability value. Alternatively, after a product of the reconstruction probability value 1, the reconstruction probability value 2, . . . , and the reconstruction probability value J is obtained, the product may be normalized based on a value of J to obtain a final reconstruction probability value.

It may be understood that, to obtain at least two candidate target sequences, steps B to D need to be performed at least twice. The at least two executions may be performed simultaneously or sequentially. A specific execution order is not limited in the present disclosure, and implementation of this embodiment of the present disclosure is not affected, provided that the at least two candidate target sequences can be obtained. Similarly, to obtain at least two reconstruction probability values respectively corresponding to the at least two candidate target sequences, steps E to G also need to be performed at least twice. The at least two executions may be performed simultaneously or sequentially. A specific execution order is not limited in the present disclosure, and implementation of this embodiment of the present disclosure is not affected, provided that the at least two reconstruction probability values can be obtained.

The sequence conversion method provided in the present disclosure is described in detail above. To verify validity of the sequence conversion method provided in the present disclosure, the sequence conversion method in the present disclosure has been tested in an application scenario of machine translation to test accuracy of translation from Chinese into English. For test fairness, the other approaches and the present disclosure are both implemented using a neural network. The other approaches use a standard neural network machine translation (NMT) system, and a test result of the present disclosure is obtained by additionally implementing the solutions of the present disclosure based on the NMT.

As illustrated in Table 1, a parameter $y_1$ $y_2$, or $y_3$ is obtained by training in a training sequence set having 1.25 million training sequence pairs, and then bilingual evaluation understudy (BLEU) scores obtained by testing technologies of the present disclosure and the other approaches are used in a standard public test set.

TABLE 1

| Model | Beam | Tuning | MT05 | MT06 | MT08 | All | Oracle |
|---|---|---|---|---|---|---|---|
| Moses | 100 | 34.03 | 31.37 | 30.85 | 23.01 | 28.44 | 35.17 |
| Other approaches | 10 | 35.46 | 32.63 | 32.85 | 25.96 | 30.65 | 34.27 |
|  | 100 | 33.39 | 29.58 | 30.21 | 23.76 | 27.97 | 40.2 |
| Technologies of the present disclosure | 10 | 36.34 | 33.73 | 34.15 | 26.85 | 31.73 | 36.05 |
|  | 100 | 37.35 | 34.88 | 35.19 | 27.93 | 32.94 | 42.49 |

In Table 1, Beam is a search space; Tuning is a development set; MT05, MT06, and MT08 are three different test sets; All represents a test set sequence; and Oracle represents an optimal theoretical value.

It can be learned from Table 1 that, a BLEU score of the technologies of the present disclosure exceeds that of the other approaches in each condition, and is 2.3 higher than the other approaches in terms of average scores. In addition, it should be noted that, in the other approaches, translation quality decreases when the search space (Beam in Table 1) increases, but in the present disclosure, this disadvantage of the other approaches is overcome well, that is, better translation quality is achieved in a larger search space.

To further verify an effect of the technologies of the present disclosure, respective effects when the technologies of the present disclosure are applied to training and to online testing have been tested. Results are shown in Table 2.

TABLE 2

| Application of solutions of the present disclosure | | Beam | |
|---|---|---|---|
| Training | Testing | 10 | 100 |
| x | x | 30.65 | 27.85 |
| ✓ | x | 31.17 | 31.51 |
| ✓ | ✓ | 31.73 | 32.94 |

It can be learned from Table 2 that, when the technologies of the present disclosure are applied only to training, a BLEU score already exceeds that of the other approaches, that is, sequence conversion quality can be improved by applying the technologies of the present disclosure only to training. When the technologies of the present disclosure are applied to training and testing, the sequence conversion quality can be further improved.

To evaluate the effect of the technologies of the present disclosure more comprehensively, cases of under-translation and over-translation problems during sequence conversion (machine translation) have been evaluated. Results are shown in Table 3.

TABLE 3

| Model | Under-translation | Over-translation |
|---|---|---|
| Other approaches | 18.2% | 3.9% |
| Technologies of the present disclosure | 16.2% | 2.4% |

It can be learned from Table 3 that, compared with the other approaches, the technologies of the present disclosure can reduce under-translation by 11.0% and reduce over-translation by 38.5%, and a better effect is achieved.

Further, compatibility between the technologies of the present disclosure and an existing related enhancement technology has been tested. Specifically, compatibility between the technologies of the present disclosure and a coverage model and between the technologies of the present disclosure and a context gate mechanism has been tested. Results are shown in Table 4.

TABLE 4

| Test model | Test score |
|---|---|
| Other approaches | 30.65 |
| Other approaches + Coverage model | 31.89 |
| Other approaches + Coverage model + Technologies of the present disclosure | 33.44 |
| Other approaches + Context gate mechanism | 32.05 |
| Other approaches + Context gate mechanism + Technologies of the present disclosure | 33.51 |
| Other approaches + Coverage model + Context gate mechanism | 33.12 |
| Other approaches + Coverage model + Context gate mechanism + Technologies of the present disclosure | 34.09 |

It can be learned from Table 4 that, there is relatively good technical compatibility between the technologies of the present disclosure and existing related enhancement technologies, that is, the coverage model and the context gate mechanism, and a BLEU score can be increased after the technologies of the present disclosure are applied. Therefore, the technologies of the present disclosure and the existing related enhancement technologies can complement each other, to further improve the sequence conversion (machine translation) quality.

It should be noted that, for brevity, the foregoing method embodiments are represented as combinations of a series of actions, but a person skilled in the art should understand that the present disclosure is not limited to the order of the described actions, because some steps may be performed in other order or performed simultaneously according to the present disclosure. In addition, a person skilled in the art should also understand that all the embodiments described in the specification are embodiments, and the related actions and modules are not necessarily mandatory to the present disclosure.

Figure 7:
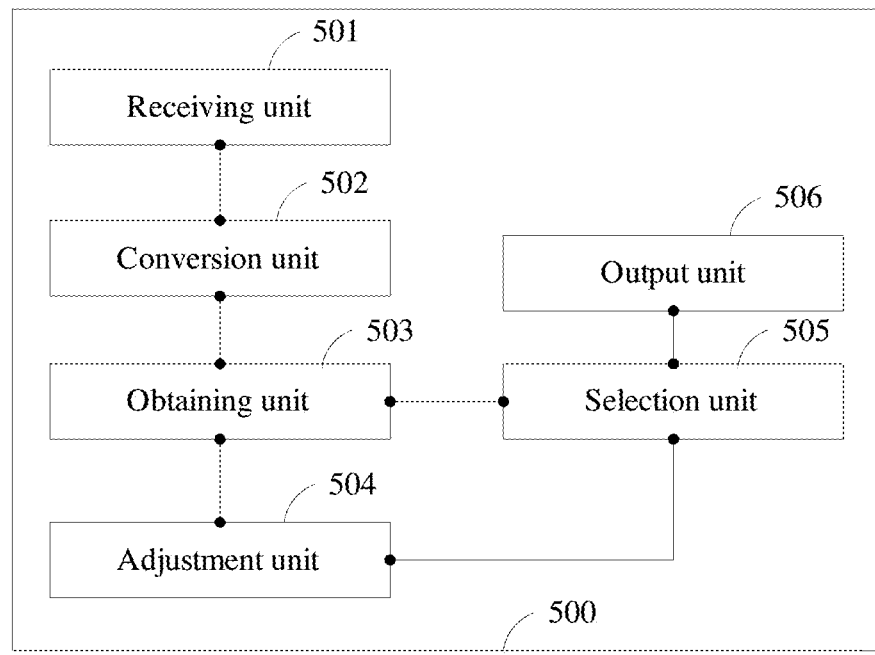
FIG. 7 is a structural diagram of a sequence conversion apparatus according to an embodiment of the present disclosure.

FIG. 7 illustrates a structure of a sequence conversion apparatus 500 according to an embodiment of the present disclosure. As shown in FIG. 7, the sequence conversion apparatus 500 includes a receiving unit 501 configured to receive a source sequence, where for a specific implementation, reference may be made to the description of step 201, and details are not described herein again, a conversion unit 502 configured to convert the source sequence into a source vector representation sequence, where for a specific implementation, reference may be made to the description of step 202, and details are not described herein again, an obtaining unit 503 configured to obtain at least two candidate target sequences and a translation probability value of each of the at least two candidate target sequences according to the source vector representation sequence, where for a specific implementation, reference may be made to the description of step 203, and details are not described herein again, an adjustment unit 504 configured to adjust the translation probability value of each candidate target sequence, where for a specific implementation, reference may be made to the description of step 204, and details are not described herein again, a selection unit 505 configured to select an output target sequence from the at least two candidate target sequences according to an adjusted translation probability value of each candidate target sequence, where for a specific implementation, reference may be made to the description of step 205, and details are not described herein again, and an output unit 506 configured to output the output target sequence, where for a specific implementation, reference may be made to the description of step 206, and details are not described herein again.

It can be learned from above that in the present disclosure, a translation probability value of a candidate target sequence is adjusted during sequence conversion, so that an adjusted translation probability value can better reflect a degree of matching between a target sequence and a source sequence. Therefore, when an output candidate target sequence is selected according to the adjusted translation probability value, a selected output target sequence can better match the source sequence, so that the obtained target sequence can be more loyal to the source sequence, thereby improving accuracy of the target sequence relative to the source sequence.

In some embodiments of the present disclosure, the obtaining unit 503 in FIG. 7 may be further configured to obtain at least two source context vectors according to the source vector representation sequence based on an attention mechanism, obtain respective decoding intermediate state sequences of the at least two source context vectors, and obtain respective candidate target sequences of the at least two decoding intermediate state sequences. Correspondingly, the adjustment unit 504 may be further configured to adjust the translation probability value based on a decoding intermediate state sequence of each candidate target sequence.

Because a candidate target sequence needs to be obtained based on a corresponding decoding intermediate state sequence, adjusting a translation probability value based on the decoding intermediate state sequence does not further increase processing load of the sequence conversion apparatus. In addition, because the decoding intermediate state sequence can represent translation accuracy of the corresponding candidate target sequence to some extent, adjusting the translation probability value according to the decoding intermediate state sequence can improve accuracy of an adjusted translation probability value, thereby improving accuracy of a final target sequence.

Figure 8:
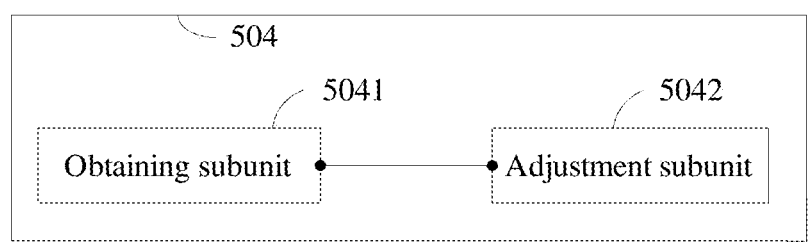
FIG. 8 is a structural diagram of an adjustment unit according to an embodiment of the present disclosure.

As shown in FIG. 8, in a specific implementation, the adjustment unit 504 included in the sequence conversion apparatus provided in this embodiment of the present disclosure may further include an obtaining subunit 5041 configured to obtain a reconstruction probability value of a first candidate target sequence based on a decoding intermediate state sequence of the first candidate target sequence, where the first candidate target sequence is any one of the at least two candidate target sequences, and an adjustment subunit 5042 configured to adjust a translation probability value of the first candidate target sequence based on the reconstruction probability value of the first candidate target sequence.

In a specific implementation, the obtaining subunit 5041 may be further configured to obtain the reconstruction probability value of the first candidate target sequence based on an inverse attention mechanism, where an input of the inverse attention mechanism is the decoding intermediate state sequence of the first candidate target sequence, and an output of the inverse attention mechanism is the reconstruction probability value of the first candidate target sequence.

In an implementation, the obtaining subunit 5041 may be further configured to obtain the reconstruction probability value of the first candidate target sequence according to the following function:

$$R(x \mid s; \gamma_1) = \prod_{j=1}^{J} g_R(x_{j-1}, \hat{h}_j, \hat{c}_j; \gamma_1),$$

where $g_R(\ )$ is a softmax function, and $\hat{c}_j$ is a vector obtained by summarization using the inverse attention mechanism, and may be obtained using the following function $$\hat{c}_j = \sum_{i=1}^{I} \hat{\alpha}_{j,i} \cdot s_i,$$

where $\hat{\alpha}_{j,i}$ is an alignment probability that is output by the inverse attention mechanism, and may be obtained using the following function $$\hat{\alpha}_{j,i} = \frac{\exp(e_{j,i})}{\sum_{k=1}^{I} \exp(e_{j,k})},$$

where $e_{j,k}$ is an inverse attention mechanism score of an element in the source sequence, and may be obtained using the following function:

$$e_{j,k} = a(\hat{h}_{j-1}, s_i; \gamma_2),$$

where $\hat{h}_j$ is an intermediate state used when the reconstruction probability value is obtained, and is obtained using the following function:

$$\hat{h}_j = f_R(x_{j-1}, \hat{h}_{j-1}, \hat{c}_j; \gamma_3),$$

where $x_j$ is an element in the source sequence, and J represents a quantity of elements in the source sequence, $s_i$ represents an element in the decoding intermediate state sequence of the first candidate target sequence, and I represents a quantity of elements in the decoding intermediate state sequence of the first candidate target sequence, $f_R$ is an activation function, and R is the reconstruction probability value, and $\gamma_1$, $\gamma_2$, and $\gamma_3$ are parameters.

In an implementation, the adjustment subunit 5042 is further configured to sum the translation probability value and the reconstruction probability value of the first candidate target sequence by linear interpolation, to obtain an adjusted translation probability value of the first candidate target sequence.

Because the translation probability value and the reconstruction probability value both can reflect accuracy of the corresponding candidate target sequence relative to the source sequence to some extent, the translation probability value and the reconstruction probability value can be balanced well by summing them by linear interpolation, so that the adjusted translation probability value can better reflect the accuracy of the corresponding candidate target sequence, and a finally obtained target sequence can better match the source sequence.

Figure 9:
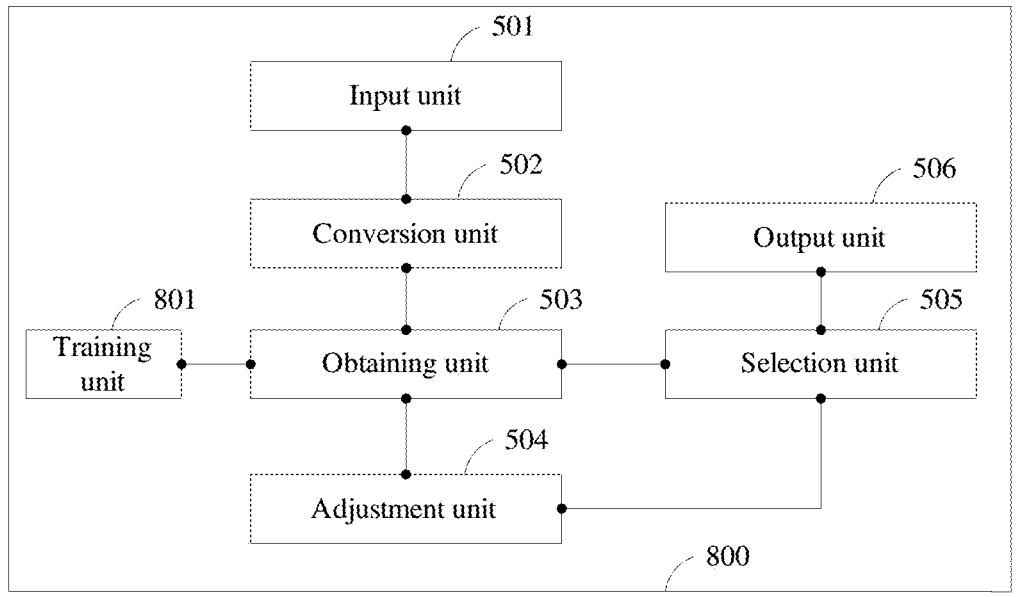
FIG. 9 is a structural diagram of a sequence conversion apparatus according to another embodiment of the present disclosure.

FIG. 9 illustrates a structure of a sequence conversion apparatus 800 according to another embodiment of the present disclosure. Compared with the sequence conversion apparatus 500 illustrated in FIG. 7, the sequence conversion apparatus 800 illustrated in FIG. 9 is added with a training unit 801 configured to obtain the parameters $\gamma_1$, $\gamma_2$, and $\gamma_3$ by training using an end-to-end learning algorithm, so that the obtaining unit 503 can obtain a candidate target sequence using the parameters $\gamma_1$, $\gamma_2$, and $\gamma_3$ that are obtained by the training unit by training. For implementations of the remaining input unit 501, conversion unit 502, obtaining unit 503, adjustment unit 504, selection unit 505, and output unit 506, refer to the foregoing description. Details are not described again.

In an implementation, the training unit 801 is further configured to obtain the parameters $\gamma_1$, $\gamma_2$, and $\gamma_3$ by training using the following function:

$$\arg\max_{\theta,\gamma} \sum_{n=1}^{N} \left\{ \underbrace{\log P(Y_n \mid X_n, \theta)}_{likehood} + \lambda \underbrace{\log R(X_n \mid s_n, \gamma)}_{reconstruction} \right\},$$

where $\theta$ and $\gamma$ are neural system parameters that need to be obtained by training, y represents the parameter $\gamma_1$, $\gamma_2$, or $\gamma_3$, N is a quantity of training sequence pairs in a training sequence set, $X_n$ is a source sequence in a training sequence pair, $Y_n$ is a target sequence in the training sequence pair, $s_n$ is a decoding intermediate state sequence used when $X_n$ is converted into $Y_n$, and $\lambda$ is a linearly interpolated value.

Figure 10:
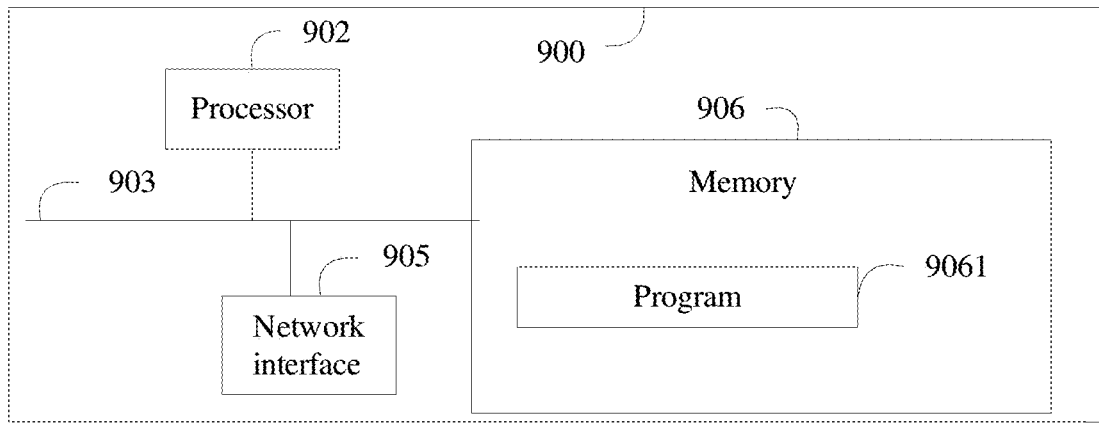
FIG. 10 is a structural diagram of a sequence conversion apparatus according to another embodiment of the present disclosure.

FIG. 10 illustrates a structure of a sequence conversion apparatus 900 according to another embodiment of the present disclosure, including at least one processor 902 (for example, a central processing unit (CPU)), at least one network interface 905 or another communications interface, a memory 906, and at least one communications bus 903 configured to implement connection and communication between these apparatuses. The processor 902 is configured to execute an executable module, such as a computer program, stored in the memory 906. The memory 906 may include a high-speed random-access memory (RAM), and may further include a non-volatile memory, for example, at least one magnetic disk storage. Communication and connection between the system gateway and at least one of other network elements are implemented using the at least one network interface 905 (which may be wired or wireless), and the Internet, a wide area network, a local area network, a metropolitan area network, or the like may be used.

In some implementations, the memory 906 stores a program 9061, the program 9061 may be executed by the processor 902, and when the program is executed, the sequence conversion method provided in the present disclosure may be performed.

In this embodiment of the present disclosure, when the sequence conversion method/apparatus is applied to machine translation, the source sequence is text in a natural language or a text file that is obtained based on the text in the natural language, and the target sequence is text in an other natural language or a text file that is obtained based on the text in the other natural language.

When the sequence conversion method/apparatus is applied to speech recognition, the source sequence is human speech content or a speech data file that is obtained based on the human speech content, and the target sequence is natural language text corresponding to the speech content or a text file that is obtained based on the natural language text.

When the sequence conversion method/apparatus is applied to an automatic dialog, the source sequence is human speech content or a speech data file that is obtained based on the human speech content, and the target sequence is a speech reply to the human speech content or a speech data file that is obtained based on the speech reply.

When the sequence conversion method/apparatus is applied to automatic summarization, the source sequence is to-be-summarized natural language text, the target sequence is a summary of the to-be-summarized natural language text, and the summary is natural language text or a text file that is obtained based on the natural language text.

When the sequence conversion method/apparatus is applied to image caption generation, the source sequence is an image or an image data file that is obtained based on the image, and the target sequence is a natural language caption of the image or a text file that is obtained based on the natural language caption.

According to the sequence conversion apparatus provided in this embodiment of the present disclosure, a translation probability value of a candidate target sequence is adjusted during sequence conversion, so that an adjusted translation probability value can better reflect a degree of matching between a target sequence and a source sequence. Therefore, when an output candidate target sequence is selected according to the adjusted translation probability value, a selected output target sequence can better match the source sequence, so that the obtained target sequence can be more loyal to the source sequence, thereby improving accuracy of the target sequence relative to the source sequence.

Figure 11:
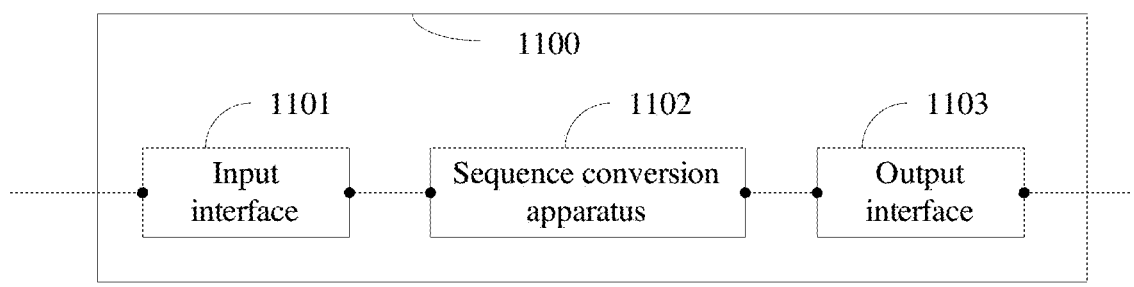
FIG. 11 is a structural diagram of a sequence conversion system according to an embodiment of the present disclosure.

FIG. 11 illustrates a structure of a sequence conversion system 1100 according to an embodiment of the present disclosure. As shown in FIG. 11, the system includes an input interface 1101, an output interface 1103, and a sequence conversion apparatus 1102. The sequence conversion apparatus 1102 may be any sequence conversion apparatus provided in the embodiments of the present disclosure, and functions and implementations thereof are not described herein again.

The input interface 1101 is configured to receive source data and convert the source data into a source sequence. The source sequence obtained by conversion may be input to the sequence conversion apparatus 1102.

A specific processing process of converting source data into a source sequence varies according to different presentation forms of the source data. For example, when the source data is a human speech, the human speech is converted into a speech data file and used as the source sequence. When the source data is an image, the image is converted into an image data file and used as the source sequence. When the source data is natural language text, the natural language text is converted into a text file and used as the source sequence. It may be understood that, a specific conversion process may be implemented using an existing common known technology, and is not limited in the present disclosure.

The output interface 1103 is configured to output an output target sequence that is output by the sequence conversion apparatus 1102.

The input interface 1101 and the output interface 1103 vary according to different specific implementation forms of the sequence conversion system. For example, when the sequence conversion system is a server or is deployed on a cloud, the input interface 1101 may be a network interface, the source data comes from a client, and the source data may be a speech data file, an image data file, a text file, or the like collected by the client. Correspondingly, the output interface 1103 may also be the network interface configured to output the output target sequence to the client.

Content such as information exchange between and an execution process of the modules in the apparatus and the system is based on a same idea as the method embodiments of the present disclosure. Therefore, for detailed content, refer to descriptions in the method embodiments of the present disclosure, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a RAM.

Specific examples are used in this specification to describe the principle and implementations of the present disclosure. The descriptions of the foregoing embodiments are merely intended to help understand the method and idea of the present disclosure. In addition, with respect to the implementations and the application scope, modifications may be made by a person of ordinary skill in the art according to the idea of the present disclosure. Therefore, this specification shall not be construed as a limitation on the present disclosure.

What is claimed is:

1. A sequence conversion method comprising:
obtaining a source sequence;
converting the source sequence into a source vector representation sequence;
obtaining a first source context vector based on the source vector representation sequence and an attention mechanism;
obtaining a second source context vector based on the source vector representation sequence and the attention mechanism;
obtaining a first decoding intermediate state sequence of the first source context vector;
obtaining a second decoding intermediate state sequence of the second source context vector;
obtaining a first candidate target sequence of the first decoding intermediate state sequence;
obtaining a second candidate target sequence of the second decoding intermediate state sequence;
adjusting a first translation probability value to a first adjusted translation probability value based on the first decoding intermediate state sequence;
adjusting a second translation probability value to a second adjusted translation probability value based on the second decoding intermediate state sequence;
selecting either the first candidate target sequence or the second candidate target sequence as an output target sequence according to the first adjusted translation probability value and the second adjusted translation probability value; and
outputting the output target sequence.

2. The sequence conversion method of claim 1, wherein adjusting the first translation probability value comprises:
obtaining a first reconstruction probability value of the first candidate target sequence based on the first decoding intermediate state sequence; and
adjusting the first translation probability value based on the first reconstruction probability value,
wherein the source sequence and the output target sequence are representations of natural language contents.

3. The sequence conversion method of claim 2, wherein adjusting the first translation probability value comprises adjusting the first translation probability value by summing the first translation probability value and the first reconstruction probability value by linear interpolation to obtain the first adjusted translation probability value.

4. The sequence conversion method of claim 2, wherein obtaining the first reconstruction probability value comprises obtaining the first reconstruction probability value based on an inverse attention mechanism, wherein an input of the inverse attention mechanism is the first decoding intermediate state sequence, and wherein an output of the inverse attention mechanism is the first reconstruction probability value.

5. The sequence conversion method of claim 4, wherein obtaining the first reconstruction probability value comprises obtaining the first reconstruction probability value according to the following function:

$$R(x \mid s; \gamma_1) = \prod_{j=1}^{J} g_R(x_{j-1}, \hat{h}_j, \hat{c}_j; \gamma_1),$$

wherein $g_R(\ )$ is a softmax function, wherein $\hat{c}_j$ is a vector obtained by summarization using the inverse attention mechanism, wherein $\hat{c}_j$ is obtained using the following function:

$$\hat{c}_j = \sum_{i=1}^{I} \hat{a}_{j,i} \cdot s_i,$$

wherein $\hat{\alpha}_{j,i}$ is an alignment probability output from the inverse attention mechanism, wherein $\hat{\alpha}_{j,i}$ is obtained using the following function:

$$\hat{a}_{j,i} = \frac{\exp(e_{j,i})}{\sum_{k=1}^{I} \exp(e_{j,k})},$$

wherein $e_{j,k}$ is an inverse attention mechanism score of an element in the source sequence, wherein $e_{j,k}$ is obtained using the following function:

$$e_{j,k} = a(\hat{h}_{j-1}, s_i; \gamma_2),$$

wherein $\hat{h}_j$ is an intermediate state used when the first reconstruction probability value is obtained, wherein $\hat{h}_j$ is obtained using the following function:

$$\hat{h}_j = f_R(x_{j-1}, \hat{h}_{j-1}, \hat{c}_j; \gamma_3),$$

wherein $x_j$ is the element in the source sequence, wherein J represents a quantity of elements in the source sequence, wherein $s_i$ represents an element in the first decoding intermediate state sequence of the first candidate target sequence, wherein I represents a quantity of elements in the first decoding intermediate state sequence of the first candidate target sequence, wherein $f_R$ is an activation function, wherein R is the first reconstruction probability value, and wherein $\gamma_1$, $\gamma_2$, and $\gamma_3$ are parameters.

6. The sequence conversion method of claim 5, further comprising obtaining $\gamma_1$, $\gamma_2$, and $\gamma_3$ by training using an end-to-end learning algorithm.

7. The sequence conversion method of claim 6, further comprising further obtaining $\gamma_1$, $\gamma_2$, and $\gamma_3$ using the following function:

$$\arg\max_{\theta,\gamma} \sum_{n=1}^{N} \left\{ \underbrace{\log P(Y_n \mid X_n, \theta)}_{likehood} + \lambda \underbrace{\log R(X_n \mid s_n, \gamma)}_{reconstruction} \right\},$$

wherein $\theta$ and $\gamma$ are neural system parameters that need to be obtained by training, wherein $\gamma$ represents one of $\gamma_1$, $\gamma_2$, or $\gamma_3$, wherein N is a quantity of training sequence pairs in a training sequence set, wherein $X_n$ is a source sequence in a training sequence pair, wherein $Y_n$ is a target sequence in the training sequence pair, wherein $s_n$ is a decoding intermediate state sequence used when $X_n$ is converted into $Y_n$, and wherein $\lambda$ is a linearly interpolated value.

8. A sequence conversion apparatus comprising:
a memory comprising instructions; and
a processor coupled to the memory and configured to execute the instructions, which cause the processor to:
  obtain a source sequence;
  convert the source sequence into a source vector representation sequence;
  obtain a first source context vector based on the source vector representation sequence and an attention mechanism;
  obtain a second source context vector based on the source vector representation sequence and the attention mechanism;
  obtain a first decoding intermediate state sequence of the first source context vector;
  obtain a second decoding intermediate state sequence of the second source context vector;
  obtain a first candidate target sequence of the first decoding intermediate state sequence;
  obtain a second candidate target sequence of the second decoding intermediate state sequence;
  adjust a first translation probability value to a first adjusted translation probability value based on the first decoding intermediate state sequence;
  adjust a second translation probability value to a second adjusted translation probability value based on the second decoding intermediate state sequence;
  select either the first candidate target sequence or the second candidate target sequence as an output target sequence according to the first adjusted translation probability value and the second adjusted translation probability value; and
  output the output target sequence,
  wherein the source sequence and the output target sequence are representations of natural language contents.

9. The sequence conversion apparatus of claim 8, wherein the processor is further configured to:
  obtain a first reconstruction probability value of the first candidate target sequence based on the first decoding intermediate state sequence; and
  further adjust the first translation probability value based on the first reconstruction probability value.

10. The sequence conversion apparatus of claim 9, wherein the processor is further configured to further adjust the first translation probability value by summing the first translation probability value and the first reconstruction probability value by linear interpolation to obtain the first adjusted translation probability value.

11. The sequence conversion apparatus of claim 9, wherein the processor is further configured to further obtain the first reconstruction probability value based on an inverse attention mechanism, wherein an input of the inverse attention mechanism is the first decoding intermediate state sequence, and wherein an output of the inverse attention mechanism is the first reconstruction probability value.

12. The sequence conversion apparatus of claim 11, wherein the processor is further configured to further obtain the first reconstruction probability value according to the following function:

$$R(x \mid s; \gamma_1) = \prod_{j=1}^{J} g_R(x_{j-1}, \hat{h}_j, \hat{c}_j; \gamma_1),$$

wherein $g_R(\ )$ is a softmax function, wherein $\hat{c}_j$ is a vector obtained by summarization using the inverse attention mechanism, wherein $\hat{c}_j$ is obtained using the following function:

$$\hat{c}_j = \sum_{i=1}^{I} \hat{a}_{j,i} \cdot s_i,$$

wherein $\hat{\alpha}_{j,i}$ is an alignment probability output from the inverse attention mechanism, wherein $\hat{\alpha}_{j,i}$ is obtained using the following function:

$$\hat{a}_{j,i} = \frac{\exp(e_{j,i})}{\sum_{k=1}^{I} \exp(e_{j,k})},$$

wherein $e_{j,k}$ is an inverse attention mechanism score of an element in the source sequence, wherein $e_{j,k}$ is obtained using the following function:

$$e_{j,k} = a(\hat{h}_{j-1}, s_i; \gamma_2),$$

wherein $\hat{h}_j$ is an intermediate state used when the first reconstruction probability value is obtained, wherein $\hat{h}_j$ is obtained using the following function:

$$\hat{h}_j = f_R(x_{j-1}, \hat{h}_{j-1}, \hat{c}_j; \gamma_3),$$

wherein $x_j$ is the element in the source sequence, wherein J represents a quantity of elements in the source sequence, wherein $s_i$ represents an element in the first decoding intermediate state sequence of the first candidate target sequence, wherein I represents a quantity of elements in the first decoding intermediate state sequence of the first candidate target sequence, wherein $f_R$ is an activation function, wherein R is the first reconstruction probability value, and wherein $\gamma_1$, $\gamma_2$, and $\gamma_3$ are parameters.

13. The sequence conversion apparatus of claim 12, wherein the processor is further configured to obtain $\gamma_1$, $\gamma_2$, and $\gamma_3$ by training using an end-to-end learning algorithm.

14. The sequence conversion apparatus of claim 13, wherein the processor is further configured to further obtain $\gamma_1$, $\gamma_2$, and $\gamma_3$ using the following function:

$$\arg\max_{\theta,\gamma} \sum_{n=1}^{N} \left\{ \underbrace{\log P(Y_n \mid X_n, \theta)}_{likehood} + \lambda \underbrace{\log R(X_n \mid s_n, \gamma)}_{reconstruction} \right\},$$

wherein θ and γ are neural system parameters that need to be obtained by training, wherein γ represents one of $\gamma_1$, $\gamma_2$, or $\gamma_3$, wherein N is a quantity of training sequence pairs in a training sequence set, wherein $X_n$ is a source sequence in a training sequence pair, wherein $Y_n$ is a target sequence in the training sequence pair, wherein $s_n$ is a decoding intermediate state sequence used when $X_n$ is converted into $Y_n$, and wherein λ is a linearly interpolated value.

15. A system comprising:
an input interface configured to:
  receive source data; and
  convert the source data into a source sequence;
an apparatus coupled to the input interface and comprising:
  a memory comprising instructions; and
  a processor coupled to the memory and configured to execute the instructions, which cause the processor to:
    obtain the source sequence from the input interface;
    convert the source sequence into a source vector representation sequence;
    obtain a first source context vector based on the source vector representation sequence and an attention mechanism;
    obtain a second source context vector based on the source vector representation sequence and the attention mechanism;
    obtain a first decoding intermediate state sequence of the first source context vector;
    obtain a second decoding intermediate state sequence of the second source context vector;
    obtain a first candidate target sequence of the first decoding intermediate state sequence;
    obtain a second candidate target sequence of the second decoding intermediate state sequence;
    adjust a first translation probability value to a first adjusted translation probability value based on the first decoding intermediate state sequence;
    adjust a second translation probability value to a second adjusted translation probability value based on the second decoding intermediate state sequence;
    select either the first candidate target sequence or the second candidate target sequence as an output target sequence according to the first adjusted translation probability value and the second adjusted translation probability value; and
    output the output target sequence, wherein the source sequence and the output target sequence are representations of natural language contents; and
an output interface coupled to the apparatus and configured to:
  obtain the output target sequence from the apparatus; and
  output the output target sequence.

16. The system of claim 15, wherein the processor is further configured to:
obtain a first reconstruction probability value of the first candidate target sequence based on the first decoding intermediate state sequence; and
further adjust the first translation probability value based on the first reconstruction probability value.

17. The system of claim 16, wherein the processor is further configured to further obtain the first reconstruction probability value based on an inverse attention mechanism, wherein an input of the inverse attention mechanism is the first decoding intermediate state sequence, and wherein an output of the inverse attention mechanism is the first reconstruction probability value.

18. The system of claim 16, wherein the processor is further configured to further obtain the first reconstruction probability value based on an inverse attention mechanism, wherein an input of the inverse attention mechanism is the first decoding intermediate state sequence, and wherein an output of the inverse attention mechanism is the first reconstruction probability value.

19. The system of claim 18, wherein the processor is further configured to further obtain the first reconstruction probability value according to the following function:

$$R(x \mid s; \gamma_1) = \prod_{j=1}^{J} g_R(x_{j-1}, \hat{h}_j, \hat{c}_j; \gamma_1),$$

wherein $g_R(\ )$ is a softmax function, wherein $\hat{c}_j$ is a vector obtained by summarization using the inverse attention mechanism, wherein $\hat{c}_j$ is obtained using the following function:

$$\hat{c}_j = \sum_{i=1}^{I} \hat{a}_{j,i} \cdot s_i,$$

wherein $\hat{a}_{j,i}$ is an alignment probability output from the inverse attention mechanism, wherein $\hat{a}_{j,i}$ is obtained using the following function:

$$\hat{a}_{j,i} = \frac{\exp(e_{j,i})}{\sum_{k=1}^{I} \exp(e_{j,k})},$$

wherein $e_{j,k}$ is an inverse attention mechanism score of an element in the source sequence, wherein $e_{j,k}$ is obtained using the following function:

$$e_{j,k} = a(\hat{h}_{j-1}, s_i; \gamma_2),$$

wherein $\hat{h}_j$ is an intermediate state used when the first reconstruction probability value is obtained, wherein $\hat{h}_j$ is obtained using the following function:

$$\hat{h}_j = f_R(x_{j-1}, \hat{h}_{j-1}, \hat{c}_j; \gamma_3),$$

wherein $x_j$ is the element in the source sequence, wherein J represents a quantity of elements in the source sequence, wherein $s_i$ represents an element in the first decoding intermediate state sequence of the first candidate target sequence, wherein I represents a quantity of elements in the first decoding intermediate state sequence of the first candidate target sequence, wherein $f_R$ is an activation function, wherein R is the first reconstruction probability value, and wherein $\gamma_1$, $\gamma_2$, and $\gamma_3$ are parameters.

20. The system of claim 19, wherein the processor is further configured to obtain $\gamma_1$, $\gamma_2$, and $\gamma_3$ by training using an end-to-end learning algorithm.

* * * * *